US011985927B2

(12) United States Patent
Olsson et al.

(10) Patent No.: US 11,985,927 B2
(45) Date of Patent: May 21, 2024

(54) PRODUCTION UNIT FOR GROWING OR PROPAGATING ORGANISMS

(71) Applicant: CLIPEX IP LIMITED, Road Town (VG)

(72) Inventors: Ashley Dean Olsson, Goulburn (AU); Ashley Norman Olsson, Darra (AU)

(73) Assignee: CLIPEX IP LIMITED, Road Town (VG)

( * ) Notice: Subject to any disclaimer, the term of this patent is extended or adjusted under 35 U.S.C. 154(b) by 260 days.

(21) Appl. No.: 17/614,484

(22) PCT Filed: May 26, 2020

(86) PCT No.: PCT/AU2020/050519
§ 371 (c)(1),
(2) Date: Nov. 26, 2021

(87) PCT Pub. No.: WO2020/237297
PCT Pub. Date: Dec. 3, 2020

(65) Prior Publication Data
US 2022/0217914 A1      Jul. 14, 2022

(30) Foreign Application Priority Data

May 28, 2019   (AU) ................................ 2019901833

(51) Int. Cl.
*A01G 9/02*   (2018.01)
*A01G 9/20*   (2006.01)
*A01G 9/24*   (2006.01)

(52) U.S. Cl.
CPC .............. *A01G 9/023* (2013.01); *A01G 9/20* (2013.01); *A01G 9/24* (2013.01)

(58) Field of Classification Search
CPC .......... A01G 9/023; A01G 9/02; A01G 9/022; A01G 9/00; A01G 31/00; A01G 31/047
See application file for complete search history.

(56) References Cited

U.S. PATENT DOCUMENTS 3,314,192 A  *  4/1967  Park ....................... A01G 9/022
                                                       47/18
2011/0252705 A1* 10/2011 Van Gemert .......... A01G 9/249
                                                       47/66.7

(Continued)

FOREIGN PATENT DOCUMENTS

CN       201894094 U      7/2011
CN       102771375 A     11/2012

(Continued)

OTHER PUBLICATIONS

International Search Report and Written Opinion for PCT/AU2020/050519, dated Jul. 24, 2020, ISA Australian Patent Office, 11 pages.

(Continued)

*Primary Examiner* — Kristen C Hayes
(74) *Attorney, Agent, or Firm* — Klarquist Sparkman, LLP

(57) ABSTRACT

A sprout, fodder or forage production unit (10a) comprising: a tray positioning system comprising a plurality of trays (2a) movable between (1) a substantially vertical stacked configuration whereby the trays (2a) extend in spaced substantially horizontal parallel planes above one another, and (2) a substantially horizontal table configuration whereby the trays (2a) are positioned next to one another on substantially a same horizontal plane. The production unit (10a) further comprises an irrigation system; a lighting system; a heating system; a ventilation system; a control system; a weighing system; and a material dispensing system.

21 Claims, 10 Drawing Sheets

(56) References Cited

U.S. PATENT DOCUMENTS

| | | | | |
|---|---|---|---|---|
| 2014/0041298 A1* | 2/2014 | Mack | ............... | B62B 3/04 |
| | | | | 47/66.6 |
| 2014/0366443 A1* | 12/2014 | Brusatore | ............... | A01G 9/02 |
| | | | | 47/65.5 |
| 2015/0150198 A1* | 6/2015 | Sinha | ............... | A01G 27/00 |
| | | | | 29/891 |
| 2017/0055471 A1* | 3/2017 | Ng | ............... | A01G 31/042 |
| 2020/0375120 A1* | 12/2020 | Kaneko | ............... | A01G 27/003 |

FOREIGN PATENT DOCUMENTS

| | | |
|---|---|---|
| CN | 107242054 A | 10/2017 |
| CN | 107517768 A | 12/2017 |
| CN | 107593158 A | 1/2018 |
| CN | 207476406 U | 6/2018 |
| CN | 208285959 U | 12/2018 |
| CN | 208446178 U | 2/2019 |
| CN | 208798484 U | 4/2019 |
| CN | 209845854 U | 12/2019 |
| KR | 101481429 B1 | 1/2015 |
| KR | 10-2019-0119753 A | 10/2019 |
| SU | 1519595 A1 | 11/1989 |

OTHER PUBLICATIONS

Office Action mailed in counterpart Chinese Patent Application No. 202080054493.0 dated Dec. 21, 2022, by the China National Intellectual Property Administration, 14 pages (English translation, 3 pages).

Supplementary European Search Report issued in related European Patent Application No. 20814025.1 by the European Patent Office dated Apr. 6, 2023 (10 pages).

\* cited by examiner

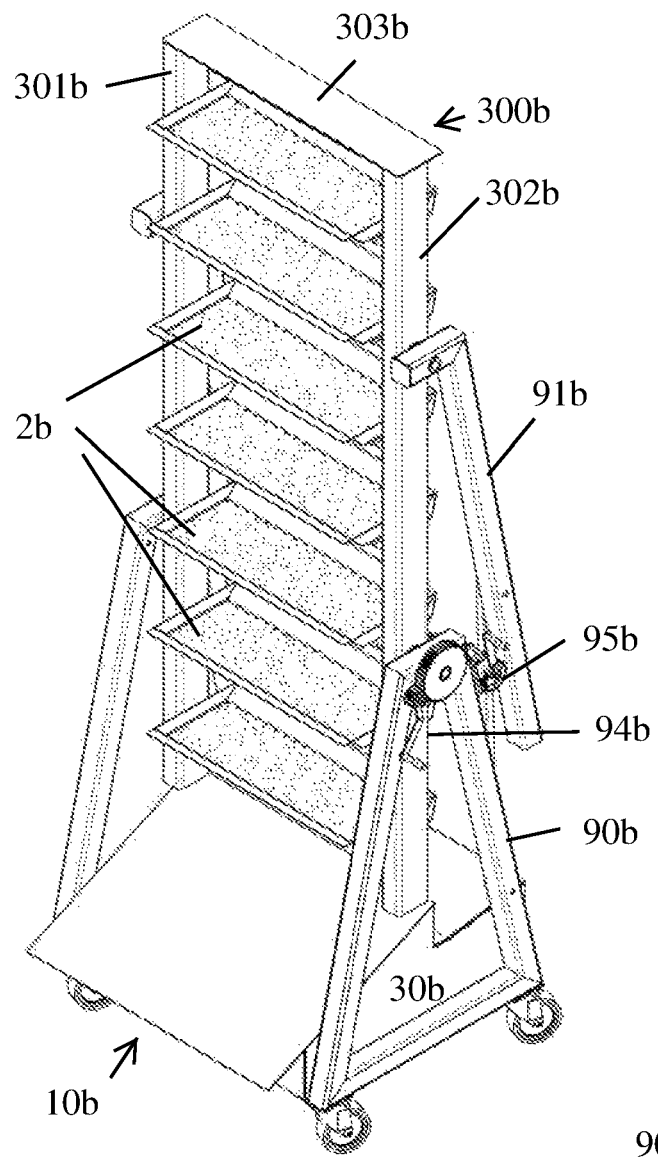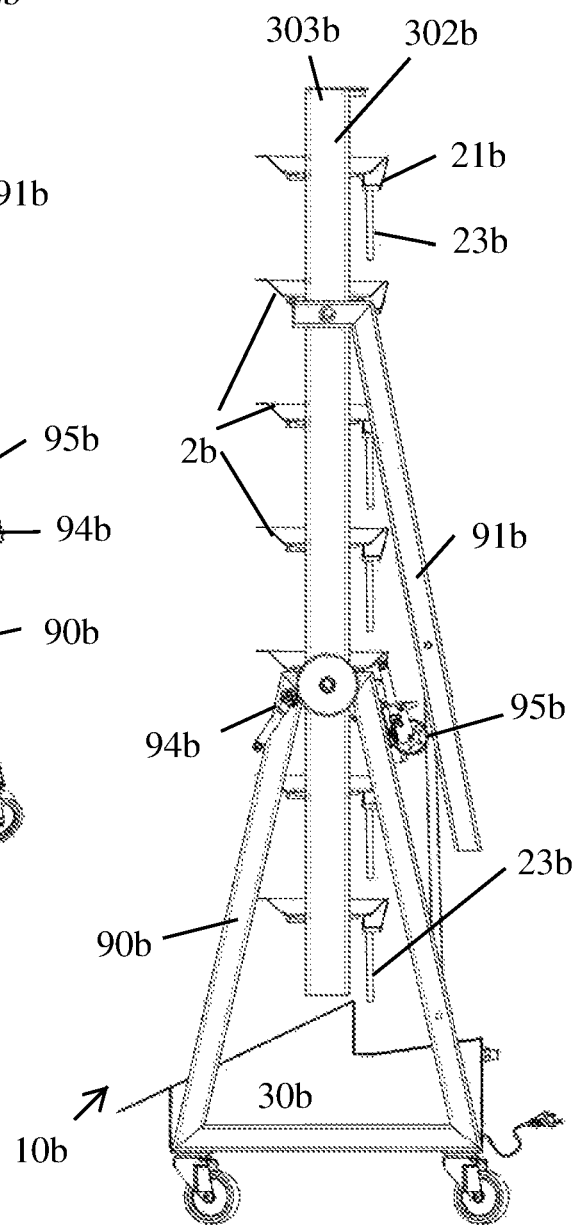
FIGURE 8
FIGURE 9

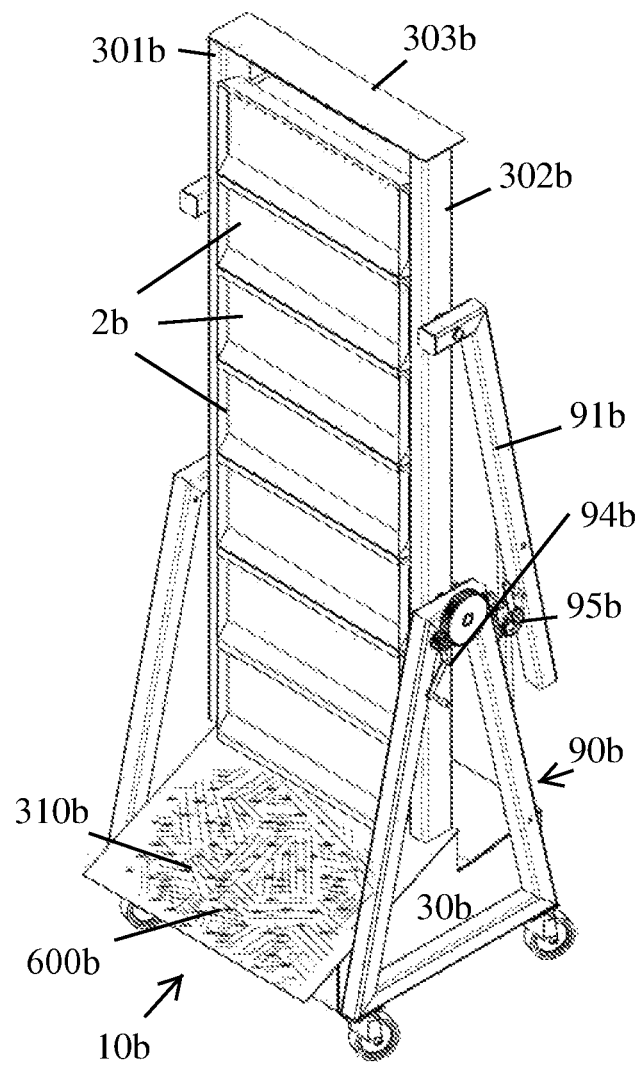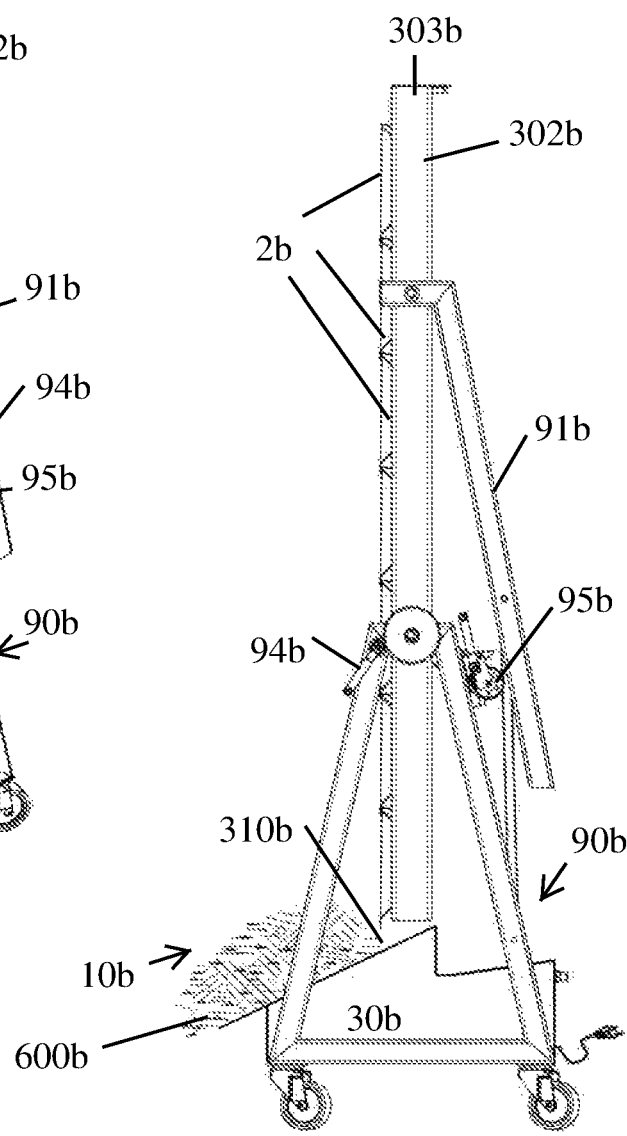
FIGURE 10
FIGURE 11

10d

PRODUCTION UNIT FOR GROWING OR PROPAGATING ORGANISMS

RELATED APPLICATIONS

This is the U.S. National Stage of International Application No. PCT/AU2020/050519, filed May 26, 2020, which in turn claims priority of Australian Provisional Patent Application No. 2019901833, filed May 28, 2019, the contents of each of which are incorporated herein by reference.

TECHNICAL FIELD

The present invention relates to a production unit for growing or propagating organisms such as protists, fungi and plant matter, including sprouts, fodder and forage.

BACKGROUND ART

Vertical farming production systems are still being developed in an attempt to make food production more reliable, easier to produce, more ergonomical for operators, using less water, using less land resources, and more cost effective.

DISCLOSURE OF THE INVENTION

According to an embodiment of the present invention, there is provided a sprout, fodder or forage production unit (or module) comprising:
 a tray positioning system comprising a plurality of trays movable between (1) a substantially vertical stacked configuration whereby the trays extend in spaced substantially horizontal parallel planes above one another, and (2) a substantially horizontal table configuration whereby the trays are positioned next to one another on substantially the same horizontal plane.

According to an embodiment of the present invention, there is provided a production unit (or module) for growing or propagating organisms comprising:
 a production surface positioning system comprising a plurality of production surfaces movable between (1) a substantially vertical stacked configuration whereby the production surfaces extend in spaced substantially horizontal parallel planes above one another, and (2) a substantially horizontal configuration whereby the production surfaces are positioned next to one another on substantially the same horizontal plane.

According to an embodiment of the present invention, there is provided a sprout, fodder or forage production unit (or module) comprising:
 a plurality of trays in a substantially vertical stacked configuration whereby the trays extend in spaced substantially horizontal parallel planes above one another; and one or more of: an irrigation system; a lighting system; a heating system; a ventilation system; a control system; and a weighing system.

According to an embodiment of the present invention, there is provided a production unit (or module) for growing or propagating organisms comprising:
 a production surface positioning system comprising a plurality of production surfaces movable between (1) a substantially vertical stacked configuration whereby the production surfaces extend in spaced substantially horizontal parallel planes above one another, and (2) a substantially horizontal configuration whereby the production surfaces are positioned next to one another on substantially the same horizontal plane; and one or more of: an irrigation system; a lighting system; a temperature controlling system; a ventilation system; a control system; a weighing system; and a material dispensing system.

According to an embodiment of the present invention, there is provided a mobile sprout, fodder or forage production unit (or module) comprising:
 a plurality of trays in a substantially vertical stacked configuration whereby the trays extend in spaced substantially horizontal parallel planes above one another; and
 one or more rollers, wheels, casters or a propulsion mechanism such that the unit has mobility either manually or autonomously.

According to an embodiment of the present invention, there is provided a mobile production unit (or module) for growing or propagating organisms comprising:
 a production surface positioning system comprising a plurality of production surfaces movable between (1) a substantially vertical stacked configuration whereby the production surfaces extend in spaced substantially horizontal parallel planes above one another, and (2) a substantially horizontal configuration whereby the production surfaces are positioned next to one another on substantially the same horizontal plane; and
 one or more rollers, wheels, casters or a propulsion mechanism that is attached or attachable to the unit such that the unit has mobility either manually or autonomously.

The unit (or module) can have features/integers as described in the specification of Australian provisional patent application number 2018902694, filed 25 Jul. 2018, provisional patent application number 2019901825, filed 28 May 2019, and PCT/AU2019/050780, filed 25 Jul. 2019, the entire contents of which are incorporated herein by way of reference.

In one or more of those specifications: "a convertible item" is akin to "a production unit"; "a plurality of shelf units" is akin to "a plurality of trays" or "a plurality of production surfaces"; "a leave support for supporting a leave" is akin to "a tray support for supporting a tray" or "a production surface support for supporting a production surface"; "a linkage system (or drive system) connected to each leave support" is akin to "a linkage system connected to each tray support" or "a linkage system connected to each production tray support"; "a shelf configuration" is akin to "a vertical stacked configuration"; "a substantially horizontal or flat surface configuration" is akin to "a substantially horizontal table configuration" or "a substantially horizontal configuration"; and "at least one surface support for supporting the shelf units and linkage system" is akin to "at least one leg assembly", "a stand" and/or "a rear leg assembly" for "supporting the trays and linkage system" or "supporting the production surfaces and linkage system".

Although in some embodiments the invention is described as being a sprout, fodder or forage production unit, realistically, other types of living organisms can be grown and/or propagated. Suitable organisms can be in the form of seeds, cuttings, spores, isolates or cultures. Suitable organisms can include single cell organisms, multi-cellular organisms, microorganisms and macro-organisms. Suitable organisms include prokaryotes, eukaryotes, plants, fungi, protists, bacteria, and multi-cellular algae. Suitable organisms include those that are naturally occurring or those that have been genetically modified. These can be grown and/or propagated for any use or purpose, whether for consumption by animals or humans or not.

According to an embodiment of the present invention, there is provided a method of producing plants, sprouts, fodder or forage, said method comprising the step of growing seeds (or other plant material) using the unit according to an embodiment of the present invention described above. This method may have one or more integers or features as described for the unit in this specification. That is, features or integers of the unit can be features or integers of the method, particularly steps of the method.

According to an embodiment of the present invention, there is provided a method of growing or propagating organisms, said method comprising the step of growing or propagating organisms using the unit according to an embodiment of the present invention described above. This method may have one or more integers or features as described for the unit in this specification. That is, features or integers of the unit can be features or integers of the method, particularly steps of the method.

The tray positioning system can be of any suitable size, shape and construction, and consist of any suitable material or materials. The tray positioning system can have any suitable number of trays. For example, the tray positioning system can have two, three, four, five, six, seven, eight, nine, 10, 11, 12, 13, 14, 15, 16, 17, 18 or even more trays. Preferably, the tray positioning system has seven to fourteen trays.

Each tray can be of any suitable size, shape and construction. Preferably, each tray is oblong, being longer than it is wide. Preferably the trays are substantially identical to each other.

One or more of the trays can be made of any suitable materials that are either naturally occurring or man-made synthetics including composites, fibres, plastics, steel, alloys, and more especially stainless steel.

Each tray can have a base, a front end, a rear end, and opposing sides. Each tray can have a raised periphery or raised rim, extending upwardly from the base. Each tray can have a front wall, a rear wall and side walls extending upwardly from the base. Any of the side walls can be slanted outwardly in such a way that material produced in the tray can be more easily removed out of or off the tray. The front wall can be slanted upwardly and outwardly from the base. The front wall can have a rim or ledge extending outwardly from a top of the front wall, substantially parallel with the base. This rim or ledge can overlap or seal atop a rear wall of an adjacent tray. The rear wall can be slanted upwardly and outwardly from the base.

The base can have an organism-support surface on which any suitable shoot/grain/seed/cutting or base organism can be placed in order to be produced. The base may be flat, corrugated or contain a series of rises or falls. The base can have at least one drain (or trough) extending beneath the organism-support surface adjacent to any wall of the tray or at any location in the base to enable any fluid (eg. liquid) to be drained if required. The drain can extend adjacent to any wall. Preferably, the drain is located on the longest side of the tray; however it may also be located along the rear wall or from side wall to side wall, or down a center of the base or spaced in any pattern on the base. The base can have drainage holes to drain any water/fluid (eg. liquid) away from the organism-support surface. Preferably the drainage holes extend along the longest portions of the tray although they may be located adjacent to either of the walls of the tray or positioned in any suitable pattern on the base.

Each drain can have a least one drainage hole or at least one drainage point located at or extending downwardly at any suitable angle from a bottom portion of the drain or base. When in the vertical stacked configuration, the drainage point can convey water/fluid from that tray to the tray below (or tank in the case of the lower most tray). The drainage point can be situated near to one of the tray side walls, in which case the bottom wall of the drain may be shaped to funnel water/fluid to the drainage point. The drainage point can be a drain pipe. In another embodiment the drainage point can convey the water/fluid to a drain that is separate to each or any of the trays in such a way that it directs the water/fluid towards the ground where it may be directed to a tank or drainage facility external to the unit.

The production surface positioning system can be of any suitable size, shape and construction, and consist of any suitable material or materials. The production surface positioning system can have any suitable number of production surfaces. For example, the production surface positioning system can have two, three, four, five, six, seven, eight, nine, 10, 11, 12, 13, 14, 15, 16, 17, 18 or even more production surfaces. Preferably, the production surface positioning system has seven to fourteen production surfaces.

Each production surface can be of any suitable size, shape and construction. Preferably, each production surface is oblong, being longer than it is wide. Preferably the production surfaces are substantially identical to each other.

In some embodiments, the or each production surface can be flat, convex, concave, have multiple bends or deflections, have stiffening ribs, have raised sides or edges, or not have raised sides or edges.

One or more of the production surfaces can be made of any suitable materials that are either naturally occurring or man-made synthetics including composites, fibres, plastics, steel, alloys, and more especially stainless steel.

Each production surface can have a base, a front end, a rear end, and opposing edges. Each production surface can have a raised periphery or raised rim, extending upwardly from the base. Each production surface can have a front wall, a rear wall and side walls extending upwardly from the base. Any of the side walls can be slanted outwardly in such a way that material produced on the production surface can be more easily removed out of or off the production surface. The front wall can be slanted upwardly and outwardly from the base. The front wall can have a rim or ledge extending outwardly from a top of the front wall, substantially parallel with the base. This rim or ledge can overlap or seal atop a rear wall of an adjacent production surface. The rear wall can be slanted upwardly and outwardly from the base.

The base can have an organism-support surface on which any suitable organism can be placed in order to be produced. The base may be flat, corrugated or contain a series of rises or falls. The base can have at least one drain (or trough) extending beneath the organism-support surface adjacent to any edge of the production surface or at any location in the base to enable any fluid (eg. liquid) to be drained if required. The drain can extend adjacent to any edge. Preferably, the drain is located on the longest side of the production surface; however it may also be located along the rear wall or from side wall to side wall, or down a center of the base or spaced in any pattern on the base. The base can have drainage holes to drain any water/fluid away from the organism-support surface. Preferably the drainage holes extend along the longest portions of the production surface although they may be located adjacent to either of the walls of the production surface or positioned in any suitable pattern on the base.

Each drain can have a least one drainage hole or at least one drainage point located at or extending downwardly at any suitable angle from a bottom portion of the drain or base. When in the vertical stacked configuration, the drainage point can convey water/fluid from that production surface to the production surface below (or tank in the case of the lower most production surface). The drainage point can be situated near to one of the production surface side edges, in which case the bottom wall of the drain may be shaped to funnel water/fluid to the drainage point. The drainage point can be a drain pipe. In another embodiment the drainage point can convey the water/fluid to a drain that is separate to each or any of the production surfaces in such a way that it directs the water/fluid towards the ground where it may be directed to a tank or drainage facility external to the unit.

The unit can comprise an irrigation system. The irrigation system can be of any suitable size, shape and construction, and can be made of any suitable material or materials. It can be comprised of individual components or be unitary and be capable of servicing or replacement.

The irrigation system can comprise a water or fluid (eg. liquid) tank. The water/fluid tank can be of any suitable size, shape and construction, and can be made of any suitable material or materials. Any suitable volume of water/fluid can be contained in the tank. For example, the tank can hold up to 1,000 L of water/fluid (eg. liquid).

The weight of the tank can be used to change the centre of gravity of the unit.

The tank can have a front wall, a rear wall and side walls extending between the front and rear walls. The tank and have a base wall as well as a top wall extending between the front, rear and side walls. The tank can have a forward region and a rearward region.

In some embodiments, a part of the top wall located at the forward region can be slanted, sloping downwardly towards a front of the unit or the floor. This part of the top wall can overhang the front wall of the tank. This can enable the material produced, including a fodder mat, biscuit or root ball, after being removed from a tray or production surface above, to be more easily slid or otherwise moved towards an operator located at a front of the unit or a base of the unit. In some embodiments, a part of the top wall located at the rearward region can have a drainage inlet for water/fluid to enter from a drainage point above. In some embodiments, the part of the top wall located at the rearward region can be slanted so as to drain water/fluid to the drainage inlet. In some embodiments, the drainage inlet can be in the form of a funnel.

The irrigation system can comprise a water or fluid inlet that is connectable to a source of water/fluid, even a low-pressure water/fluid (eg. liquid) source. The water/fluid inlet can be of any suitable construction but will typically comprise a spigot or hose fitting, particularly a quick-connect fitting, such fitting can be either a male of female connection point for connection to a source of water/fluid (eg. by way of a hose or tube or reticulation system). The water/fluid inlet is preferably located in the side wall of the tank such that in one embodiment should one unit be placed against a wall or fixture or a series of units be stacked against a wall or fixture wherein the front of one unit is facing the rear of the adjoining unit and the back side of all the units will be adjacent the wall or fixture.

The irrigation system can comprise a fill valve, float valve, ball valve or electrically controlled inlet valve located externally or within the tank and operably connected to the water/fluid inlet. The valve can allow the tank to fill with water/fluid when the water/fluid level within the tank drops below a predetermined level.

The irrigation system can comprise a filter positioned to filter any reticulated water/fluid (eg. liquid) that is returning from the trays or production surfaces to the tank. In some embodiments, the filter is associated with the drainage inlet, enabling only filtered water to enter the tank. In another embodiment the filter receives water from a pump and filters the water before it is reticulated to the irrigation system to prevent or reduce blockages in the system.

The tank can be insulated so as to minimise heat loss. This can be achieved in any suitable way.

The irrigation system can comprise a water or fluid (eg. liquid) dispenser situated above each tray or production surface for producing a water or fluid spray, mist or drip, for irrigating the organism material/s located on those trays or production surfaces. In some embodiments, the water/fluid dispenser can comprise a pipe, tube or conduit having one or more nozzles, heads or other types of water/fluid dispensers for producing a drip, mist or spray. The nozzles, heads or other types of water/fluid outlets can be serviceable and replaceable.

In other embodiments, the irrigation system can comprise at least one water or fluid dispenser situated above and/or alongside each tray or production surface for flooding the base or organism-support surface (flood irrigation technique). These embodiments would do away with the need for spray nozzles.

In some embodiments, the water/fluid dispenser can be positioned adjacent a bottom portion of a tray or production surface and across that tray or production surface. Preferably, the water/fluid dispenser extends along a length of a bottom portion of each tray or production surface, except for the lower most tray or production surface and the upper most tray or production surface, in which case (in respect of the upper most tray or production surface) the water/fluid dispenser extends along another component of the unit, such as the tray positioning system or production surface positioning system.

In some embodiments, the irrigation system comprises a water or fluid dispenser housing that is connected to a bottom portion of a tray or production surface and is adapted to house the water/fluid dispenser, wherein a hose or pipe extends within the housing, and a plurality of nozzles, heads or other types of outlets extend through openings in the housing.

The irrigation system can comprise a water or fluid pump for pumping water or fluid to each water/fluid dispenser. The pump can be of any suitable construction. In some embodiments the pump is located within the tank. The pump can have a power lead connectable to a power source. The pump can be powered by power mains, battery or solar power, for example.

The pump can be in fluid communication with the water dispenser and this can be achieved in any suitable way. In some embodiments, a pipe manifold extends from the pump to the water dispensers. The pipe manifold can comprise a series of hoses, pipes, tubes or other conduit types connected to the pump and water dispensers.

In some embodiments, some or most of the pipe manifold is concealed within components of the tray positioning system or production surface positioning system, such as within a frame member and/or stand.

The pump can be programmed to cycle on and off for the optimum rate of production.

The irrigation system can comprise an ozone generator so as to kill microbes growing with the water/fluid. The ozone generator can be of any suitable construction. In some embodiments the ozone generator is located within the tank. The ozone generator can have a power lead connectable to a power source. The ozone generator can be powered by power mains, battery or solar power, and controlled by the control system to maximise efficiency for example.

The irrigation system can comprise a carbon dioxide generator so as to carbonate the water or fluid within the tank, to improve production. The carbon dioxide generator can be of any suitable construction. In some embodiments the carbon dioxide generator is located within the tank. The carbon dioxide generator can have a power lead connectable to a power source. The carbon dioxide generator can be powered by power mains, battery or solar power, and controlled by the control system to maximise efficiency for example.

The irrigation system can comprise a water or fluid (eg. liquid) flow meter so as to monitor the amount of water/fluid pumped to the water/fluid dispensers and also provide water usage data to the control system to assist with data collection and maximise efficiency. The water/fluid flow meter can be of any suitable construction. In some embodiments the water/fluid flow meter is plumbed in line with the pipe manifold. The flow meter can have a power lead connectable to a power source. The flow meter can be powered by power mains, battery or solar power, for example.

The unit can comprise a material dispensing system that can dispense any required material(s)/chemical(s) to any one or more of the trays or production surfaces, to help produce the desired outcome of the material being produced in the unit. The material dispensing system can be of any suitable construction. In some embodiments, the material dispensing system comprises at least one dispensing container. The at least one dispensing container may contain any suitable type or types of materials or chemicals, including trace elements, nutrients, hormones, growth promoters, herbicides, pesticides, fungicides or fertilisers. The at least one dispensing container can be a single use disposable container or a re-fillable or re-usable container. The at least one dispensing container can be of any suitable construction.

In some embodiments the irrigation system can comprise the material dispensing system. In other embodiments, the material dispensing system is separate from the irrigation system.

In some embodiments the dispensing container is plumbed to or in-line with the irrigation system or a separate pipe manifold for the dispensing of the materials held in the dispensing container. Any of the dispensing container contents can be drawn from the dispensing container by way of a venturi effect or by measured dosage with such measured dosage controlled by a control system, thereby enabling the collection of data, and such data can be used to calculate the cost and potential benefit to the consumer of the material being produced in the unit of the various measured dosages of material.

In some embodiments, the dispensing container can comprise a blend of trace elements, growth promoters, minerals, supplements, organic or in-organic materials that can be changed to assist in achieving the desired outcome of the materials/organisms being produced. If the material being produced in the unit is for livestock consumption then the needs of the livestock being fed can be taken into consideration and the contents or ratios of any blend of the materials can be adjusted when taking into account the seasonal or individual needs of the livestock (for example sick animals, or when lambing, calving, gestation, fattening etc). If the material/organisms being produced in the unit is for human consumption the contents of the at least one dispensing canister can be adjusted and customised to help produce material/organisms in the unit that may provide greater health and wellbeing for the consumer of the materials/organisms being produced in the unit. The at least one dispensing container may also contain material to prevent or help reduce undesired impacts, outcomes, reactions or activities in the materials/organisms being produced. Such undesired impacts, outcomes, reactions and activities could be brought about by contaminants, pests, microbial agents or undesired organisms or chemical reactions.

The unit can comprise a lighting system. The lighting system can be of any suitable size, shape and construction.

The lighting system can comprise a light source situated generally above each tray or production surface for illuminating or assisting in the production of the material/organisms being produced and located on the tray or production surface beneath. In some embodiments, the light source can comprise a series of lights, such as a series of light emitting diodes (LEDs). The LED lights can emit light of differing wavelengths, such as blue light and red light. In some embodiments a strip of lights (preferably LEDs) extends along a length adjacent a bottom of each tray or production surface, except for the lower most tray or production surface and the upper most tray or production surface, in which case (in respect of the upper most tray or production surface) the strip of lights extends along another component of the unit, such as the tray positioning system or production surface positioning system.

The lighting system can comprise a lighting power source electrically connected to the light sources. The lighting power source can be of any suitable construction. The lighting power source can have a power lead connectable to a power source. The lighting power source can be powered by power mains, battery or solar power, for example.

The lighting power source can be electrically connected to the light sources and this can be achieved in any suitable way. In some embodiments, wires extend from the lighting power source to the light sources.

In some embodiments, some or most of the wires are concealed within components of the tray or production surface positioning system, such as within a frame member and/or leg assembly/stand.

In some embodiments, the lighting system comprises a light source housing that is connected to a bottom surface of a tray or production surface and is adapted to hold the light source, wherein wires extend through the housing. In another embodiment the light source frequency and periods of operation are controlled by the control system.

The unit can comprise a temperature controlling system. The temperature controlling system can be of any suitable size, shape and construction, and consist of any suitable material or materials. The temperature controlling system can have any suitable number of temperature transfer components.

The temperature controlling system can comprise temperature transfer components for heating and cooling water/fluid to a predetermined temperature. The temperature transfer component/s can be located on or within the unit or within a component of the unit such as a water/fluid tank. The temperature transfer component can be of any suitable construction. For example, it could be a heating element or a cooling element.

The temperature controlling system comprises a method for heating and cooling the underside of the tray or production surface upon which the material/organisms being produced rests to a predetermined temperature that is best suited to promote and regulate production of the material/organisms being produced in the unit. In some embodiments when producing materials/organisms for livestock consumption, the temperature controlling system can comprise a heating or cooling coil or other suitable heat or cold emitting material or fabric that transfers heat or cold through the tray or production surface to the underside of the material/organisms being produced and resting on the upper side of the tray or production surface. The region of the material/organisms being produced and located immediately adjacent to the upper surface of the tray or production surface is often referred to as the root ball of a plant or fodder or sprouts. By transferring either heat or cold through the tray or production surface and into the root ball of the material/organisms being produced the unit is able to maintain the root ball to a predetermined temperature of between 12-28 degrees Celsius, and more especially to maintain a root ball temperature of between 20-22 degrees Celsius in a region of approximately 1-50 mm within the root ball adjacent to the upper surface of the tray or production surface. The temperature controlling system operates to consistently maintain a desired temperature range of approximately 12-28 drees Celsius within the lower portions or root ball of the material/organisms being produced adjacent to the upper surface of each tray or production surface. The temperature controlling system can maintain a temperature for a distance of between 1-50 mm within the base or root ball of the material/organisms being produced due the fluid/water/temperature wicking effect present in the root ball. The wicking effect occurs when moisture/warmth/cold is effectively transferred between the material/organisms being produced on the tray or production surface to help disperse the moisture, warmth or cooling properties more evenly in the material/organisms being produced in the unit. The temperature control system enables the unit to maintain consistent production rates in all seasons and in most geographical locations. In some embodiments there is an insulation barrier situated, or connected or attached on the underside of the tray or production surface to help minimise thermal loss to the atmosphere and maximise operating efficiencies. The insulation barrier is especially employed when current is passed through the tray or production surface by the temperature controlling system to more efficiently maintain the optimal system operating or growing temperature and reduce thermal losses.

In some embodiments the temperature transfer component comprises a heater element that extends along the bottom of each tray or production surface and covers a significant proportion of the underside of the tray or production surface. In other embodiments the tray or production surface itself can become the heater element by passing current through the tray or production surface. In another embodiment there is located on the underside of each tray or production surface a void that has an inlet and outlet manifold at each end of the void with the void covering the majority of the underside surface of the tray or production surface. The temperature controlling system regulates the passing of either heated or cooled liquid through the void to maintain the root ball of the material/organisms being produced at a designated temperature. The liquid that is passed through the temperature controlling system can be heated or cooled using any suitable energy transfer method including geothermal transfer, solar heating, reverse cycle heat pumps, liquid-to-liquid, closed-loop dry system, closed-loop dry system with trim cooling, open-loop evaporative system, closed-loop evaporative system, or chilled water system.

The temperature controlling system can comprise a temperature controlling power source electrically connected to the temperature transfer components. The temperature controlling power source can be of any suitable construction. The temperature controlling power source can have a power lead connectable to a power source. The temperature controlling power source can be powered by power mains, battery or solar power, for example.

The temperature controlling power source can be electrically connected to the temperature transfer component/s and this can be achieved in any suitable way. In some embodiments, wires extend from the temperature controlling power source to the temperature transfer component/s.

In some embodiments, some or most of the wires are concealed within components of the tray or production surface positioning system, such as within a frame member and/or stand.

In another embodiment the temperature transfer component (ie. heating element or a cooling element) output and periods of operation are controlled by the control system.

The unit can comprise a ventilation system. The ventilation system can be of any suitable size, shape and construction, and consist of any suitable material or materials. The ventilation system can have any suitable number of fans for circulating air over the trays or production surfaces.

A fan can be located at each end of the tray or production surface. One of the fans can suck air, whereas the other fan can blow air so as to move air over the top of the tray or production surface producing the desired material. In some embodiments the fans are connected to a bottom of each tray or production surface, except for the lower most tray or production surface and the upper most tray or production surface, in which case (in respect of the upper most tray or production surface) the fans are connected to another component of the unit, such as the tray or production surface positioning system.

The ventilation system can comprise a ventilation power source electrically connected to the fans. The ventilation power source can be of any suitable construction. In some embodiments the ventilation power source is located within the tank, preferably a bottom of the tank adjacent a wall of the tank. The ventilation power source can have a power lead connectable to a power source. The ventilation power source can be powered by power mains, battery or solar power, for example.

The ventilation power source can be electrically connected to the fans and this can be achieved in any suitable way. In some embodiments, wires extend from the ventilation power source to the fans.

In some embodiments, some or most of the wires are concealed within components of the tray or production surface positioning system, such as within a frame member and/or stand. In another embodiment the ventilation system operation is controlled by the control system.

The tray or production surface positioning system can be as described in the specification of Australian provisional patent application number 2018902694, filed 25 Jul. 2018, provisional patent application number 2019901825, filed 28 May 2019, and PCT/AU2019/050780, filed 25 Jul. 2019, the entire contents of which are incorporated herein by way of reference.

The tray or production surface positioning system can comprise at least one tray support or production surface support for supporting each tray or production surface. Preferably the tray or production surface positioning system comprises two tray supports or two production surface supports for supporting each tray or production surface. The at least one tray support or production surface support for supporting the tray or production surface can be of any suitable size, shape and construction, and can be made of any suitable material or materials. For example, each tray support or production surface support can be made of bamboo, wood (particleboard, chipboard, MDF, timber), laminated timbers, laminates, metal, alloys including aluminium and stainless steel and/or plastics material. The tray support or production surface support can in some embodiments be in the form of a shelf bracket or gusset.

In some embodiments, each tray support or production surface support can be connected or connectable to a rotatable shaft of the linkage system (drive system). In some embodiments, each tray support or production surface support can have an opening for receiving a respective rotatable shaft of the linkage system. In some embodiments, the tray support or production surface support is in the form of a casting, such as a triangular casting fastened to the tray or production surface and having an opening for receiving a shaft of the linkage system. The casting can be made of metal. In alternate embodiments the tray support or production surface support may be any suitable shape and in the form of a moulded, printed, fabricated, cut-out or extruded part and may be made out of any suitable material including polycarbonates, plastics, alloys, aluminium, carbon fibre, wood or cellulose.

In some embodiments, the linkage system (drive system) comprises a respective shaft connected or connectable to each tray support or production surface support. Each shaft can have a tray support or production surface support connecting end. Each shaft can have a working region. The working region can be of integral construction with a remainder of the shaft, or the working region can be a separate piece detachably connected to the remainder of the shaft. The shaft may be solid or hollow. Where it is hollow it may accommodate or provide accommodation for wires, tubes or other accessories to be passed through the hollow shaft from the working region end of the shaft to the tray support or production surface support connecting end to provide a convenient and discrete route for power or light or water to be supplied to each independent tray or production surface. The working region can be detachably connected to the remainder of the shaft in any suitable way. The tray support or production surface support connecting end of the shaft can be connected to the tray support or production surface support by way of a screwed or threaded connection, key and keyway arrangement, or a splined arrangement, for example. The working region of the shaft can be connected to the remainder of the shaft by way of a screwed connection, key and keyway arrangement, or a splined arrangement, for example. In other embodiments the tray support or production surface support end, shaft (said shaft can be hollow or solid) and connecting end is one integral part capable of connecting or being connectable to the linkage system. The tray support or production surface support integral working part complete with solid or hollow shaft with a connecting or connectable working end can be of a unitary construction and made of any suitable material and produced by either singular or multiple processes including casting, moulding, forming, machining, printing or stamping.

In another embodiment the tray support or production surface support is one piece that extends along the entire length of the tray or production surface and is connected to the tray or production surface at both ends of the tray or production support. Such a tray support or production surface support member may be connected or connectable at at least one end to the linkage system.

In some embodiments, the linkage system (drive system) comprises a respective shaft connected or connectable to each tray support or production surface support. Each shaft can have a tray support or production surface support connecting end. Each shaft can have a working region. Each shaft can be hollow. Each shaft can be of tubular construction. If hollow or tubular, wires of the lighting system, or parts of the pipe manifold or pipes/hoses of the water dispenser, can extend there through.

In some embodiments, the linkage system (drive system) comprises at least one mounting frame extending alongside the tray supports or production surface supports, and said shafts can extend through a wall of the mounting frame such that the working regions and tray supports or production surface supports are located at opposite sides of the wall.

The mounting frame can be of any suitable size, shape and construction, and can consist of any suitable material or materials. The mounting frame can comprise one or more frame members. A frame member can extend alongside the tray supports or production surface supports. A respective frame member can extend alongside each side of the trays or production surfaces, such that the tray supports or production surface supports situated on a first end of the trays or production surfaces can be connected to a first frame member, and the tray supports or production surface supports situated on a second end of the tray or production surface can be connected to a second frame member. The mounting frame can comprise one or more cross pieces connecting the first frame member to the second frame member, particularly above the upper most tray or production surface—to which the light source and water/fluid dispenser can be connected.

The mounting frame or frame member can be of hollow or tubular construction and the working region of the shaft can be located within the hollow section. In some embodiments, the mounting frame or frame member can comprise a beam that has a C- or U-shaped cross section/channel, and the working region of the shaft can be located within the channel.

Wires of the lighting system, or parts of the pipe manifold or pipes/hoses of the water/fluid dispenser, can extend through a frame member or other components of the mounting frame.

In some embodiments, the linkage system (drive system) comprises at least one drive connected to the working regions of the shafts, such that the shafts can be rotated in unison relative to the mounting frame. In some embodiments, the linkage system comprises at least one drive connected to the working regions of the shafts, such that the mounting frame can be pivoted between the vertical and horizontal configurations relative to the trays or production surfaces.

The drive can be of any suitable construction. In some embodiments, the drive comprises at least one rigid linkage member connected to the working region/s of the shafts by way of pivot pins or fastening pins. The rigid linkage member can be in the form of a bar or tube or other load carrying/transferring member. Preferably, the rigid linking member is linear. In some embodiments, the working region is in the form of a flange and the rigid linkage member is pinned to the flange by way of a pivot pin, fastening pin, bolt, sleeve, stepped shoulder fastener, rivet or other suitable fastener.

In some embodiments, the drive comprises a first rigid linkage member connected to the working regions of the shafts at a first end of the trays or production surfaces by way of pivot pins, fastener, rivets, or pins. In some embodiments, the drive comprises a second rigid linkage member connected to the working regions of the shafts at a second end of the trays or production surfaces by way of pivot pins, fastener, rivets or pins.

In some embodiments, the drive comprises a primary rigid linkage member pair and a secondary rigid linkage member pair. The primary linkage member pair can comprise first and second primary linkage members connected to the working regions of the shafts at the first and second ends of the trays or production surfaces by way of pivot pins/fastening pins. The secondary linkage member pair can comprise first and second secondary linkage members connected to the working regions of the shafts at the first and second ends of the trays or production surfaces by way of pivot pins/fastening pins, and the secondary linkage member pair can be spaced from the primary linkage member pair such that the primary and secondary linkage member pairs are able to pivot in unison and parallel with each other when the trays or production surfaces are pivoted between the stacked configuration and substantially horizontal configuration.

If the drive comprises two rigid linkage members and these are connected to a said working region, then these can be pinned to the flange at opposing sides of the flange.

In some embodiments, the drive comprises at least one worm gear which engages the working regions of the shafts. In some embodiments, the working region is in the form of a spur gear that meshes with the worm gear. As the worm gear turns, so do the shafts in unison.

In some embodiments, the drive comprises a first worm gear connected to the working regions of the shafts at a first end of the trays or production surfaces. In some embodiments, the drive comprises a second worm gear connected to the working regions of the shafts at a second end of the trays or production surfaces.

In some embodiments, the drive comprises at least one bevel gear which engages the working regions of the shafts. In some embodiments, the working region is in the form of a spur gear that meshes with the bevel gear. As the bevel gear turns, so do the shafts in unison.

In some embodiments, the drive comprises a first bevel gear connected to the working regions of the shafts at a first end of the trays or production surfaces. In some embodiments, the drive comprises a second bevel gear connected to the working regions of the shafts at a second end of the trays or production surfaces.

In some embodiments, the drive comprises at least one pair of racks that engage the working regions of the shafts. In some embodiments, the working region is in the form of a pinion that meshes with and between the racks. As the shaft/pinion turns, the racks slide back and forth within the mounting frame or frame member.

In some embodiments, the drive comprises a first pair of racks connected to the working regions of the shafts at a first end of the trays or production surfaces. In some embodiments, the drive comprises a second pair of racks connected to the working regions of the shafts at a second end of the trays or production surfaces.

In some embodiments, the drive comprises a plurality of motors, each of which engages a working region of a shaft. Each of the motors can be electrically connected so that all motors turn the shafts in a synchronised manner.

In some embodiments, the drive comprises a gear train, allowing the motor to be geared down.

In some embodiments, the drive comprises encoders or other electronic means for monitoring and controlling the speed and degree of rotation of the motors.

In some embodiments, the drive comprises a first plurality of motors connected to the working regions of the shafts at a first end of the trays or production surfaces. In some embodiments, the drive comprises a second plurality of motors connected to the working regions of the shafts at a second end of the trays or production surfaces.

In some embodiments, the drive comprises at least one chain or belt drive that engages the working regions of the shafts. In some embodiments, the working region is in the form of a sprocket that meshes with the chain or belt drive. In some embodiments the drive can comprise tensioners located between the sprockets. In some embodiments there can be multiple belts or chains between sprockets.

In some embodiments, the drive comprises a first chain or belt drive connected to the working regions of the shafts at a first end of the trays or production surfaces. In some embodiments, the drive comprises a second chain or belt drive connected to the working regions of the shafts at a second end of the trays or production surfaces.

The drive can further comprise at least one handle, crank or motor. The at least one handle, crank or motor can be operably connected (directly or indirectly) to a shaft, spur gear, worm gear, bevel gear, chain or belt drive, pinion or racks (as the case may be), so as to rotate the shafts in unison relative to the mounting frame, or so as to pivot the trays or production surfaces between the vertical and horizontal configurations relative to the mounting frame.

In some embodiments, the shaft that is connected or connectable to each tray support or production surface support can further extend from the working region completely through the frame member and engage the handle, crank or motor.

In some embodiments the angle at which a tray or production surface extends can be adjustable independently of the other trays or production surfaces. That is, the shaft that is connected to the tray support or production surface support can be further pivoted/rotated as required despite engaging the drive. In some embodiments, a locking gear mechanism utilising meshed gears and a pivoting latch that lockingly engages the gears can be used. In some embodiments, a spring-loaded pivot can be used. In some embodiments, a thread lock can be used for fine adjustment of the tray angle.

In some embodiments the shaft that is connected or connectable to each tray support or production surface support can further be rotated independently of the other connected or connectable drive working end of the mechanisms by way of an independent drive ring that is situated between the frame or housing member and the working end of the shaft such that the tray support or production surface support shaft is undependably rotatable around the shaft axis via a friction ring and gear mechanism.

In some embodiments the angle at which every tray or production surface extends can be adjustable at the same time. That is, the shaft that is connected to the tray support or production surface support can be further pivoted/rotated as required despite engaging the drive. In some embodiments, a locking gear mechanism utilising meshed gears and a pivoting latch that lockingly engages the gears can be used. In some embodiments, a spring-loaded pivot can be used. In some embodiments, a thread lock can be used for fine adjustment of the tray or production surface angle.

The drive can comprise a further handle, crank or motor for adjusting the angle at which a tray or production surface extends, independently or not independently of the other trays or production surfaces. The further handle, crank or motor can be operably connected (directly or indirectly) to the shaft of the tray or production surface requiring adjustment.

The mounting frame can have a front end that corresponds with the lower most tray or production surface, and a rear end that corresponds to the top most tray or production surface.

The unit can comprise a weigh scale associated with each tray or production surface. The weigh scale can be of any suitable size, shape and construction, and can be made of any suitable material or materials. For example, in some embodiments, the weigh scale can be a strain gauge. In some embodiments, the weigh scale can extend between the shaft of the linkage system and mounting frame/frame member.

In some embodiments, a moulded inbuilt weigh scale, which sits inside either a moulded plastic or aluminium extrusion shaft and is also connected to the mounting frame or frame member, enables each tray or production surface to be weighed individually.

The tray or production surface positioning system can comprise at least one leg assembly to support the trays or production surfaces and linkage system above the ground. In some embodiments, the leg assembly is a stand. The stand can be of any suitable size, shape and construction, and consist of any suitable material or materials. The stand can be connected near to the front end of the mounting frame.

In some embodiments, the stand can comprise an upper region and a lower region. The stand can comprise a front leg assembly each side of the mounting frame. An upper region of each front leg assembly can be pivotally connected to the mounting frame. A lower region of each front leg assembly can be interconnected by way of one or more interconnecting pieces. One or more cross pieces can also interconnect the lower region of one front leg assembly to the other. These cross pieces can provide a support structure on which the water/fluid tank can rest. Each front leg assembly can comprise splayed legs for greater stability when supporting the trays in the vertical configuration.

The tray or production surface positioning system can comprise an anti-tip system so that the unit is always balanced when moving between the different configurations. This is especially important to enable the safe transition from a tall vertical configuration unit height of say 1.5 metres, or 2 metres, or 3 metres or 4 meters or 5 meters to an ergonomically preferred working horizontal configuration height for most people of between 800 mm to 1400 mm. For example, the at least one leg assembly can have an at least one additional leg assembly pivotally connected to the linkage system and/or other unit component whereby legs of the leg assembly extend apart from each other when pivoting to the horizontal configuration, and the legs move closer together when pivoting to the vertical configuration. The leg assembly can be configured similarly to that of a collapsible stroller for an infant. The leg assembly can comprise at least one gas strut or pneumatic piston, mechanical drive system or electric actuator to assist with reconfiguration of the unit when the legs move relative to each other.

The anti-tip system can comprise a front leg assembly and a rear leg assembly to support the trays or production surfaces and linkage system above the ground. The front and rear leg assemblies can be of any suitable size, shape and construction, and consist of any suitable material or materials.

In some embodiments, the front leg assembly comprises an upper region and a lower region. The front leg assembly can comprise an upwardly extending front leg each side of the mounting frame. An upper region of each front leg can be pivotally connected to the mounting frame. A lower region of each front leg can be interconnected by way of one or more interconnecting pieces. One or more cross pieces can interconnect the lower regions of the front legs. These cross pieces can provide a support structure on which the water/fluid tank can rest.

In some embodiments, the rear leg assembly comprises an upper region and a lower region. The rear leg assembly can comprise an upwardly extending rear leg each side of the mounting frame. An upper region of each rear leg can be pivotally connected to the mounting frame. A lower region of each rear leg can be interconnected by way of one or more interconnecting pieces. One or more cross pieces can interconnect the lower regions of the rear legs.

In some embodiments, the anti-tip system can comprise a front leg assembly comprising at least an upwardly extending pair of front legs spaced apart from one another, each said front leg comprising a front leg upper region operably connected directly or indirectly to the mounting frame and a front leg lower region supporting at least one wheel. The anti-tip system can comprise a rear leg assembly comprising at least an upwardly extending pair of rear legs spaced apart from one another, each said rear leg comprising a rear leg upper region operably connected directly or indirectly to the mounting frame, and a rear leg lower region supporting at least one wheel.

The anti-tip system can comprise a linkage assembly interconnecting the front and rear leg assemblies. A spacing between the front and rear leg lower regions can increase as the trays or production surfaces move towards the substantially horizontal configuration. The spacing between the front and rear leg lower regions can decrease as the trays or production surfaces move towards the substantially vertical tray configuration. The front and rear leg lower regions can remain in contact with a ground surface at all times.

The linkage assembly can determine a maximum spacing allowable between the front and rear legs. The linkage assembly can comprise at least one brace having a first end pivotally connected to a front leg and a second end pivotally connected to a rear leg. Preferably, a first brace is connected to a first front and rear leg, and a second brace is connected to a second front and rear leg. When moving to the vertical tray or production surface configuration, the lower regions of the upwardly extending legs of the front and rear leg assemblies can move towards each other and the brace can move towards vertical. When moving to the substantially horizontal configuration, the lower regions of the upwardly extending legs of the front and rear leg assemblies can move away from each other to a maximum spacing dictated by a length of the brace, and the brace can move towards horizontal. In the substantially vertical configuration, the linkage member can extend substantially vertically. In the substantially horizontal configuration, the linkage member can extend at about 45 degrees relative to the horizontal.

In some embodiments, the linkage assembly can comprise at least one hinged brace comprising a hinge region, a first end pivotally connected (or hinged) to a front leg and a second end pivotally connected or hinged to a rear leg. Preferably, a first hinged brace is connected to a first front and rear leg, and a second hinged brace is connected to a second front and rear leg. When moving to the substantially vertical configuration, the lower region of the front and rear legs can move towards each other and the hinge region enables the hinged brace to fold upwardly. When moving to the substantially horizontal configuration, the front and rear leg lower regions move away from each other to a maximum spacing dictated by the length of the hinged brace, and the hinged brace unfolds and extends substantially horizontally.

In some embodiments, the linkage assembly can comprise at least one riser extending from the hinged brace to a part of the mounting frame. Preferably, a riser extends from each hinged brace. The riser can have an upper end and a lower end. In some embodiments, the lower end of the riser is pivotally connected (or hinged) to the hinge region of the hinged brace, and the upper end of the riser is pivotally connected (or hinged) to a part of the mounting frame. In some embodiments, the riser is straight/linear. In some embodiments, the riser is arcuate or bent. The riser can be pivotally connected (or hinged) to the mounting frame or frame member. When moving to the vertical configuration, the front and rear leg lower regions move towards each other and the riser extends at an angle closer to vertical. When moving to the substantially horizontal configuration, the front and rear leg lower regions move away from each other to a maximum spacing dictated by the length of the hinged brace, and the riser can extend substantially parallel with the front legs when in the substantially horizontal configuration. When moving from the vertical configuration, the riser can push on the hinged brace and cause the front and rear leg lower regions to move away from each other. When moving from the horizontal configuration, the riser can pull on the hinged brace and cause the front and rear leg lower regions to move towards each other.

The control system of the unit can comprise a positioning system of any suitable design such that the position and orientation of the unit can be measured and controlled, such position may or may not be, determined in real time and the position, or change of position or the time of each change or the distance travelled for each movement or the path of travel can be measured and recorded. In another embodiment the movement of the unit, or a series of units wirelessly connected to a central microprocessor of the control system can be programmed, controlled and logged via said central microprocessor controlled system, such system capable of producing reports to analyse the individual and total movement of each unit the power efficiency of each unit the maintenance schedule for each unit and the overall production data and efficiency of each unit or the total production efficiency of the total system where a series of units are connected to a central microprocessor.

The unit can be mobile, movable from one location to another and this can be achieved in any suitable way and can be moved manually or via a propulsion system. In another embodiment the propulsion system can be incorporated as a part of the structure of the unit and can be controlled by a microprocessor of the control system that is a connected to the unit and capable of communicating with the propulsion system to control the movements of the unit without the need of a human operator being present.

In another embodiment the unit can be connectable and disconnectable to a propulsion unit that is separate from the unit with the propulsion unit having its own microprocessor and power source such as a re-chargeable battery bank or re-chargeable power storage system on board so that the propulsion system is capable of moving without being connected to a control system by any physical tether—in other words the propulsion unit can be wirelessly connected and controlled. In another embodiment the connectable/disconnectable propulsion system can move along set pathways or tracks wherein the propulsion unit being on said pathways or tracks receives power and control commands via a physical contact between the propulsion system and the pathway.

In another embodiment there is at least one unit and one separate propulsion unit to form an autonomous automated system. In another embodiment there is a series of at least two, three, four, five, six, seven, eight, nine, ten or more units, up to about 100 units, and at least one connectable/disconnectable propulsion unit capable of operating together to form a system for the growing or propagation of organisms.

In another embodiment where there is more than one unit there is a common infrastructure of at least one water/fluid liquid supply that each unit can connect to and disconnect from when being moved by a propulsion unit, wherein the propulsion unit can be a part of the unit or separate from the unit and be connectable and disconnectable from each of any one unit.

In another embodiment where there is more than one unit there is a common infrastructure of at least one power supply that each unit can connect to and disconnect from when being moved by a propulsion unit, wherein the propulsion unit can be a part of the unit or separate from the unit and be connectable and disconnectable from each any one unit.

In another embodiment where there is more than one unit there is a common infrastructure of one power supply and one water/fluid supply that each unit can connect to and disconnect from both the water and power infrastructure when being moved by a propulsion unit wherein the propulsion unit can be a part of the unit or separate from the unit and be connectable and disconnectable from each any one unit. Where there is one or more units with propulsion systems on board the unit/s or the propulsion system is separate from the unit/s and connectable and disconnectable from each unit to form a system for the loading of seed and production of sprouts, fodder or forage (for example) the system can be manually operated without a microprocessor or semi-automated with any one or more function/s of the unit/s or one or more function/s of the system partly controlled by a microprocessor or fully automated whereby the system is capable of self-management and self-control.

In some embodiments, at least one leg assembly has one or more wheels, castors rollers or tracks for moving the unit from one location to another. In some embodiments a leg assembly comprises one or more wheels, casters rollers or tracks for moving the unit from one location to another, preferably when in its vertical configuration. Preferably, a caster, roller, track or wheel or a caster, roller, track or wheel pair is pinned to each front leg assembly, eg. a stand in some embodiments.

The tray or production surface positioning system can comprise a rear leg assembly connected near to the rear end of the mounting frame, to stabilise the unit when in the horizontal configuration. The rear leg assembly can be of any suitable size, shape and construction, and consist of any suitable material or materials.

In some embodiments, the rear leg assembly can comprise an upper region and a lower region. The rear leg assembly can comprise a rear leg each side of the mounting frame. An upper region of each rear leg can be pivotally connected to the mounting frame. A lower region of each rear leg can be pivotally interconnected with the stand by way of one or more interconnecting pieces, for greater stability.

Each of the rear legs can be pivotally connected to the mounting frame by way of a pivot pin or shaft to a respective tray or production surface support such that when the trays or production surfaces are moved to the vertical configuration then the lower region of each rear leg moves towards the mounting frame, and when the trays are moved to the horizontal configuration then the lower region of each rear leg moves away from the mounting frame to meet the ground.

In some embodiments a first end of the unit can be connected to a fixture such as a wall or floor and a second end of the unit can be raised or lowered relative to the first end such that the trays or production surfaces are movable between the substantially vertical stacked configuration and substantially horizontal configuration. This can be achieved in any suitable way. In some embodiments, a front leg assembly is connected to a fixture, and a rear leg assembly can be raised or lowered relative to the front leg assembly. In some embodiments, a first end of the at least one mounting frame is connected to a fixture, and a second end of the at least one mounting frame can be raised or lowered relative thereto.

The unit can comprise a control system. The control system can be of any suitable size, shape and construction.

The control system can comprise any suitable position control system that is able to determine the exact position of each module in relation to the total infrastructure or any particular part of the infrastructure, for example a designated harvesting zone or module or a cleaning zone or module or a re-seeding or re-populating zone or module. The suitable positioning location and control system is capable of placing and controlling each unit in relation to any other unit. The control system may utilise GPS of fixed positioning modules.

The control system can comprise an on-board microprocessor that controls and records all processes, positions and associated data.

The control system can send data to a remote receiver or generate reports based on the data and send those reports to a remote receiver, preferably to be shared with the unit owner or operator.

The control system can monitor and report on one or more of the following parameters: water consumption; fodder/forage/sprout/organism production weight per tray or production surface/total unit; number of cycles; power consumption; costs per Kg of sprout, fodder, forage or organism; cycle time; average tray/production surface temperature of root ball; conversion ratio from seed to sprout, fodder or forage; consumption and cost of nutrients and trace elements; unit errors, service schedules and other parameters as required.

The control system can comprise a controller housing. The controller housing can be of any suitable size, shape and construction, and can be made of any suitable material or materials.

The controller housing can have a display, such as a liquid crystal display.

The control system can comprise logic circuitry such as a PLC, microprocessor or microcontroller. The logic circuitry can be contained within the controller housing. The control system may be configured logic in the form of reprogrammable software or hardcoded software executed by the microcontroller. Alternatively, the control system may be configured with hardcoded logic in the form of an application specific integrated circuit, or programmable logic in the form of a field programmable gate array. Hardcoded logic may be incorporated in conjunction with a microcontroller or in place of a microcontroller.

The control system may be reprogrammable by a user, or by a connected controller, and be suitably configured for any design and operating conditions.

The control system can comprise a transceiver module, such as a 3G, 4G, 5G or other wireless transceiver module.

The control system can comprise a CAN/LIN communication interface or bus.

The controller can be connectable to a power supply.

The control system can comprise a wireless transceiver module for both transmitting and receiving data wirelessly between the microcontroller and a remote device, such as a receiver, server, PC, website or user interface.

The control system can comprise a CAN/LIN communication interface or bus, enabling communication between the microcontroller and other applications, devices or user interface.

Connection to the control system can be made via CAN bus (Controller Area Network), LIN bus (Local Interconnect Network) connections to allow real time/live time viewing, or logging, of parameters and operation.

The wireless transceiver module can provide online connection and data transmission to a receiver, server, PC, smartphone, web interface or other web portal as required.

The control system or logic circuit can communicate either through a wired connection or wirelessly (e.g., Wi-Fi (WLAN) communication, Satellite communication, RF communication, infrared communication, or Bluetooth™) via the wireless transceiver, with a standalone computer, a computer network, a website interface, smart phone or other electronic device.

The control system can have a data logging or other data recording function, or communicate with a receiver having a data logging or other data recording function. The receiver can have a CPU. The receiver can have memory. The receiver can have a display screen. The receiver can have a user-friendly interface. The receiver can have a printing function.

Operating parameters to be used by the control system may be configured by way of a user interface in wireless communication with the controller via the 3G, 4G, 5G or other wireless transceiver module.

The control system can control any electrical components of the unit, such as lighting, irrigation, ventilation, propulsion, positioning, weighing, material dispensing system etc.

The control system can be connected to a remote receiver such as a server, smartphone, smart device, tablet, user interface, PC, web portal, laptop, IOS or Android system using a wireless connection or wired connection (eg. Bluetooth, LIN, CAN or USB connection).

The control system can comprise a display, such as a LCD.

The control system can comprise a control panel.

The control system can control the irrigation and lighting schedule.

The unit can be used to sprout a variety of grains and seeds for livestock and/or human consumption, including barley, alfalfa, sunflowers, mung beans, wheatgrass, fenugreek, onion, snow peas, and the like.

Each unit can have its own unique serial number.

The unit can be autonomous, being self-contained and mobile.

The units, when used in multiples, can be positioned in rows with very little space between them, thereby maximising the output per square meterage of floor space.

When multiple units are employed there can be a central harvesting/re-seeding zone where the units can be brought to, located in place and then automatically harvested, into a mulcher and dispenser/washed and re-seeded to enable the continuation of production. This minimises the amount/cost of supporting infrastructure/build that is required for higher volume operations.

Where multiple units are employed, a computer controlled robot lifting and moving device (something similar in concept to the LOWPAD AGV rack moving robot) can further reduce labour costs and burdensome lifting and moving.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

Preferred features, embodiments and variations of the invention may be discerned from the following Description of Embodiments which provides sufficient information for those skilled in the art to perform the invention. The Description of Embodiments is not to be regarded as limiting the scope of the preceding Disclosure of the Invention in any way. The Description of Embodiments will make reference to a number of drawings as follows:

BRIEF DESCRIPTION OF THE DRAWINGS

FIG. 8 is a front elevation view of the unit of FIG. 6, but shown in the vertical stacked configuration.

FIG. 9 is a side elevation view of that shown in FIG. 8.

FIG. 10 is a front perspective view of the unit shown in FIG. 8, but showing that the trays have been emptied so as to allow fodder mats/root balls to fall.

FIG. 11 is a side elevation view of the unit shown in FIG. 10.

DESCRIPTION OF EMBODIMENTS

The unit 10*a* comprises a ventilation system comprising fans 6 for circulating air over the top of each tray 2*a*.

Figure 17:
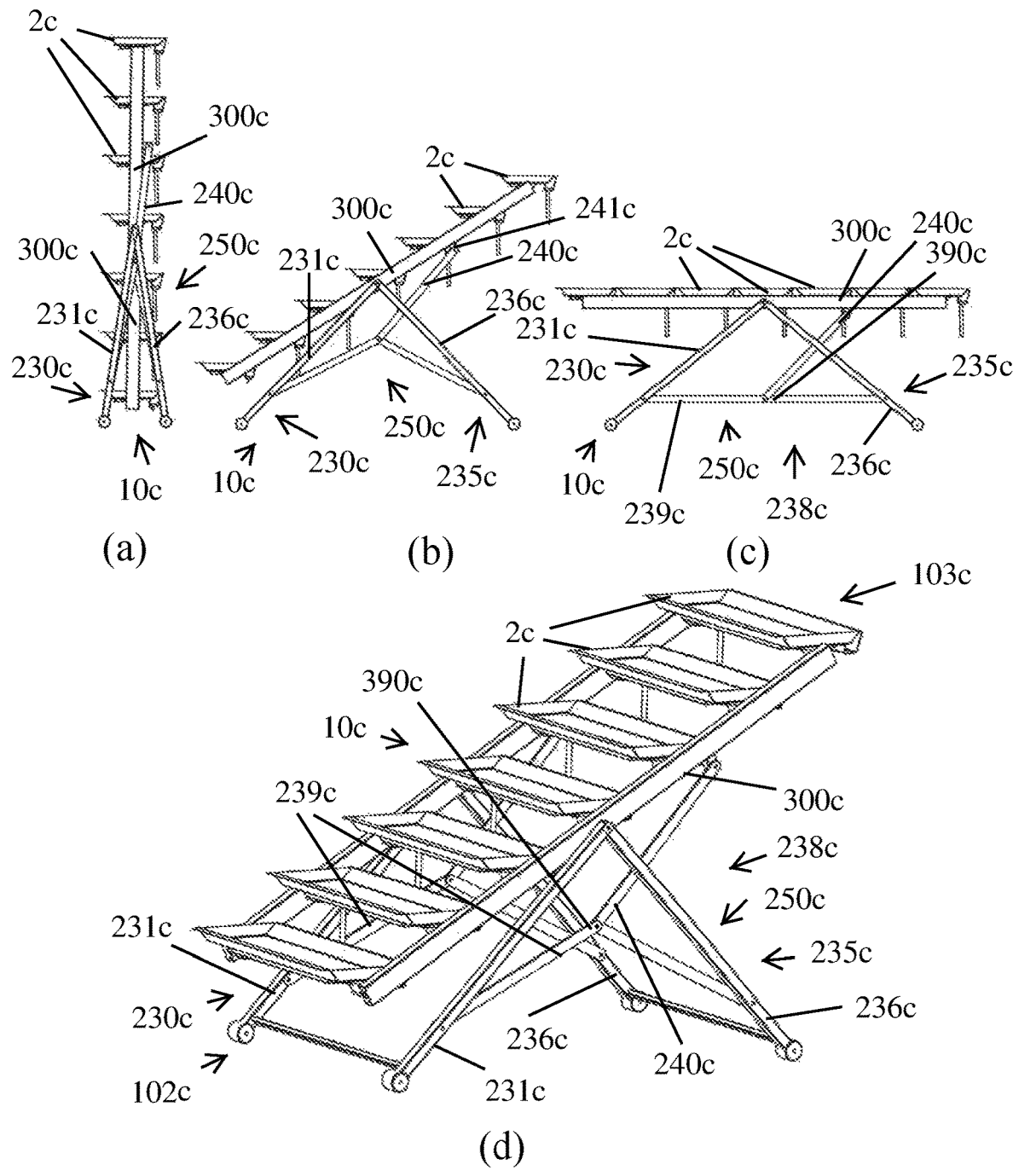
FIGS. 17 (*a*), (*b*), (*c*) and (*d*) shows a fodder, sprout or forage production unit employing an anti-tip system, according to another embodiment of the present invention.

FIGS. 1-5 show a sprout, fodder or forage production unit 10*a* according to a first embodiment of the present invention. FIGS. 6 to 16 show another sprout, fodder or forage production unit 10*b* according to a second embodiment of the present invention that is very similar to the first unit 10*a*, but stripped of some features that appear in unit 10*a*. FIG. 17 shows yet another sprout, fodder or forage production unit 10*c* according to an embodiment of the present invention, but stripped of features that appear in the other units 10*a*, 10*b*. That is, unit 10*b* is a more basic representation of unit 10*a*, but these share virtually all the same features. This unit 10*b* has the same numbering as unit 10*a*, except that the letter 'b' is used in place of the letter 'a'.

Figure 1:
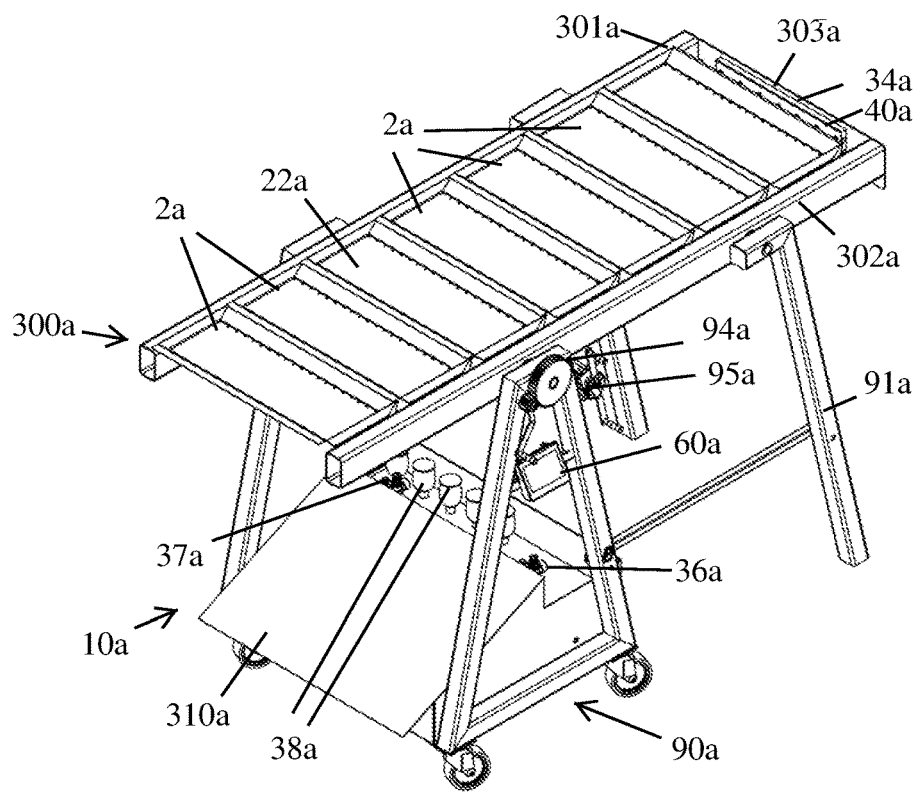
FIG. 1 shows a fodder, sprout or forage production unit in a substantially horizontal table configuration, according to an embodiment of the present invention.
Figure 2:
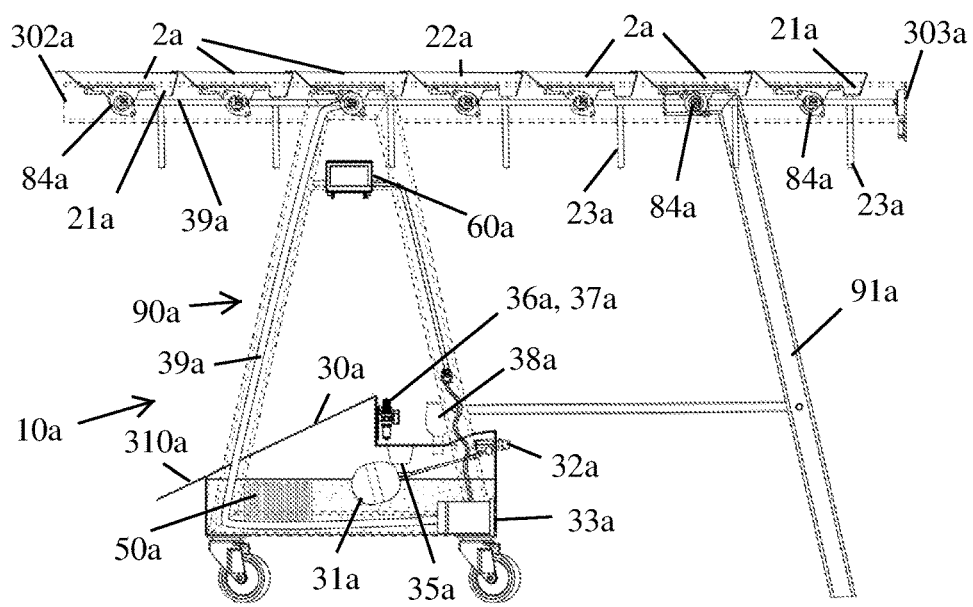
FIG. 2 is a detailed side view of the unit shown in FIG. 1.

Referring first to FIGS. 1-5, the unit 10*a* comprises a tray (production surface) positioning system comprising seven trays 2*a* movable between (1) a vertical stacked configuration whereby the trays 2*a* extend in spaced substantially horizontal parallel planes above one another (see FIGS. 8 and 9 for unit 10*b*), and (2) a horizontal table configuration whereby the trays 2*a* are positioned next to one another in substantially the same horizontal plane (see FIGS. 1 and 2).

The unit 10*a* comprises an irrigation system comprising a tank 30*a*, float valve 31*a*, hose coupling 32*a*, water pump 33*a*, water dispensers 34*a*, filter 35*a*, pipe manifold 39*a* extending between the pump 33*a* and the water dispensers 34*a*, ozone generator 36*a*, carbon dioxide generator 37*a*, water flow meter (not shown), and (refillable or disposable) nutrient containers 38*a*.

The unit 10*a* comprises a lighting system comprising light sources 40*a*, lighting power source (not shown), and wiring/cables 41*a* extending between the light sources 40*a* and lighting power source.

The unit 10*a* comprises a heating system comprising a water heater 50*a*, sprout heaters 51*a* and heater power source (not shown).

The unit 10*a* comprises a ventilation system comprising fans (not shown) for circulating air over the top of each tray 2*a*.

The unit 10*a* comprises a control system that includes a touch sensitive display 60*a*.

The unit 10*a* comprises a weigh scale associated with each tray 2 (not shown). The weight scale is a strain gauge situated with a hollow shaft 80*a* and extending to a mounting frame member, thereby enabling each tray 2*a* to be weighed individually.

Each tray 2*a* has a front wall, a rear wall and side walls extending upwardly from a base. The front wall slants upwardly and outwardly from the base. The front wall has a rim or ledge extending outwardly from a top of the front wall, substantially parallel with the base. This rim or ledge overlaps or seal atop a rear wall of an adjacent tray 2*a*, as seen in FIG. 2. This prevents seed falling between trays 2*a*.

Figure 6:
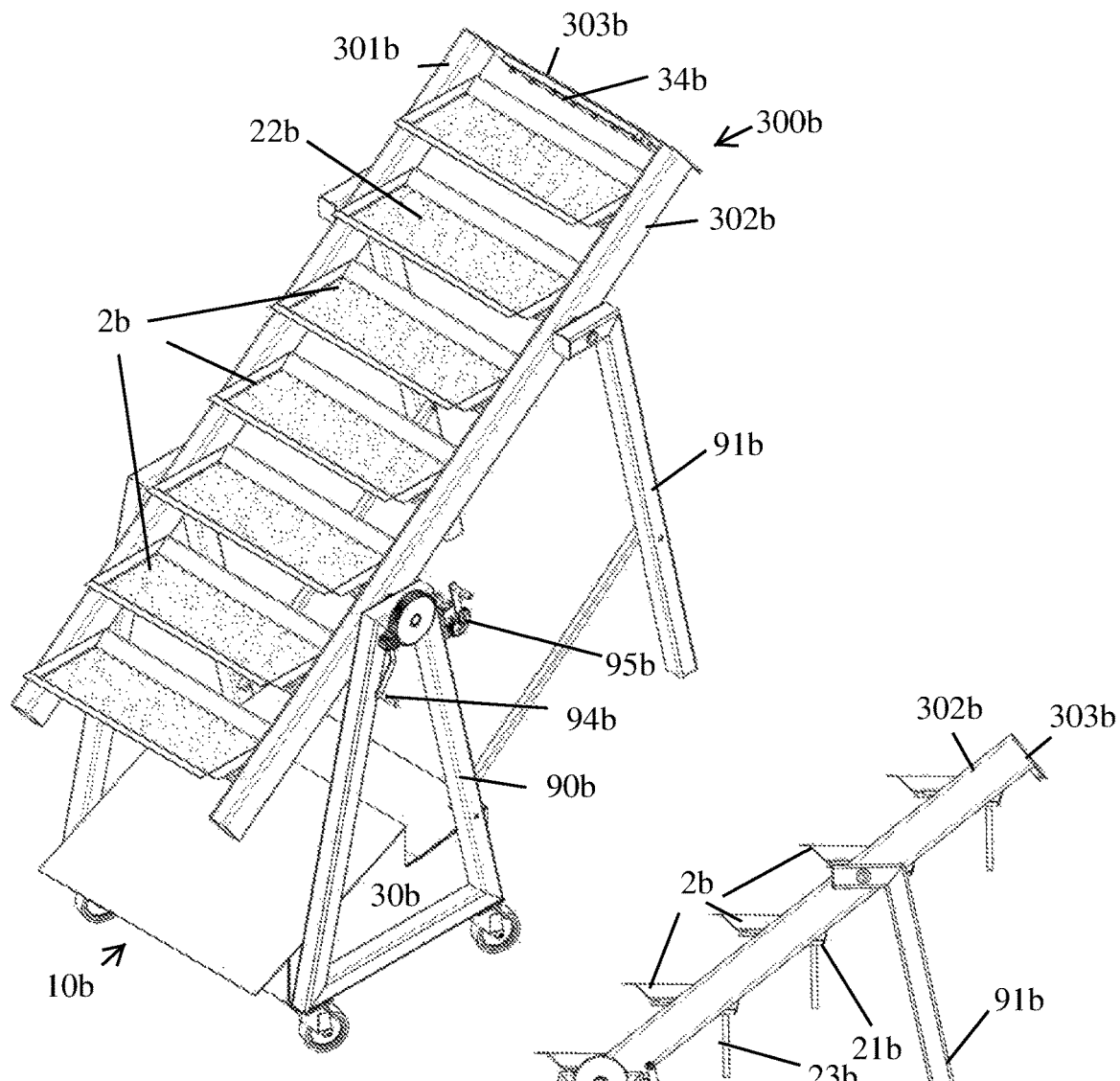
FIG. 6 is a side elevation view of a fodder, sprout or forage production unit between vertical and horizontal configurations, showing how seeds/sprouts can be grown, according to another embodiment of the present invention.
Figure 7:
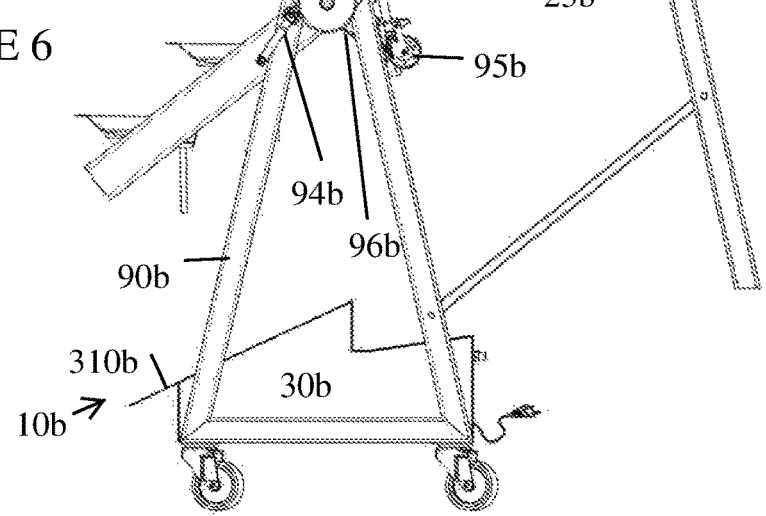
FIG. 7 is a side elevation view of that shown in FIG. 6.

The base can have an organism-support surface 22*a* on which sprouts/seeds can be grown (see FIGS. 1 and 6). The tray 2*a* has a drain 21*a* extending beneath the organism-support surface 22*a* adjacent the rear wall of the tray 2*a*. The base has drainage holes situated above the drain 21*a* so that water can flow from the organism-support surface 22*a* to the drain 21*a*.

Each drain 21*a* has a drainage point/drain pipe 23*a* located at or extending downwardly from a bottom wall of the drain 21*a*. When in the vertical stacked configuration (as seen in FIG. 9), the drain pipe 23*a* can convey water from that tray 2*a* to the tray below and finally to the tank 30*a*.

The weight of the tank 30*a* can be used to change the centre of gravity of the unit 10*a*.

The tank 30a has a top wall 310a that slopes downwardly towards a front of the unit 10a. This can enable a fodder mat, biscuit or root ball (see 600b in FIGS. 10 and 11), after being dropped from a tray 2a above, to be more easily slid or otherwise moved towards an operator or container located at a front of the unit 10a. This can be seen in FIGS. 10 and 11.

Another part of the top wall 310a has a drainage inlet containing the filter 35a, for receiving water dripping from a tray drain 21a above.

The water inlet 32a is connectable to a source of water, even low-pressure water, using a quick-connect hose fitting.

Each water dispenser 34a is situated above each tray 2a for producing a water spray or drip, for irrigating sprouts/seeds located on those trays 2a. The water dispenser 34a comprises a housing that houses a pipe 39a having nozzles 341a for producing a water drip or spray. The nozzles are replaceable.

The pump is in fluid communication with the water dispensers 34a by way of the pipe manifold 39a. Most of the pipe manifold 39a is concealed within components of the tray positioning system, as seen in FIG. 2.

The ozone generator can kill microbes growing with the water.

Regarding the ventilation system, a fan 6 can be located at each end of the tray 2a. One of the fans 6 can suck air, whereas the other fan 6 can blow air so as to move air over the top of the tray 2a growing plant material. The fans 6 are connected to a bottom of most trays 2a.

The water flow meter can monitor the amount of water pumped to the water 34a dispensers.

The refillable nutrient containers 38a can dispense nutrients into the tank 30a. The nutrient containers comprise a blend of trace elements and minerals, that can be changed to suit the needs of the livestock being fed and the season (lambing, calving, gestation, fattening etc).

Figure 4:
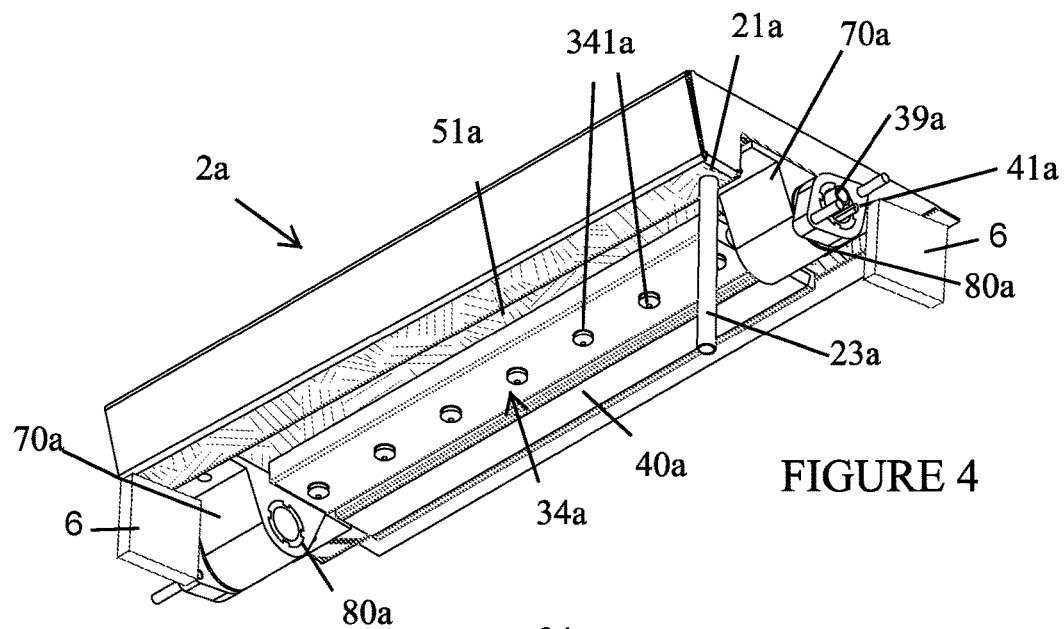
FIG. 4 is an underside perspective view of a tray and other components of the unit shown in FIG. 1.
Figure 5:
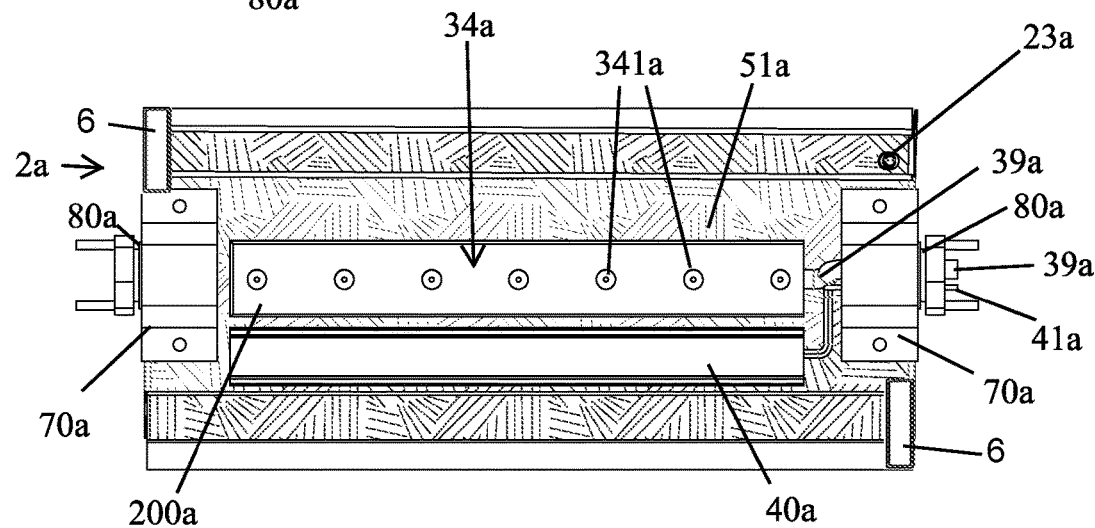
FIG. 5 is a bottom plan view of that shown in FIG. 4.

The light source 40a is situated above each tray 2a for illuminating sprouts located on the tray 2a beneath. The light source 40a comprises a strip of LED lights, as seen in FIGS. 4 and 5. Most of the wires 41a are concealed within components of the tray positioning system, such as within a frame member and/or leg assembly/stand.

The water heater (heating element) 50a warms water to a predetermined temperature. The water heater 50a is located within the tank 30a.

The sprout heater 51a heats seeds/sprouts on the tray 2a to a predetermined temperature. The sprout heater 51a is a heater coil embedded within the shaft 80a. Most of the wires are concealed within components of the tray positioning system, such as within a frame member and/or stand.

Regarding the ventilation system, although not shown, a fan can be located at each end of the tray 2a. One of the fans can suck air, whereas the other fan can blow air so as to move air over the top of the tray 2a growing plant material. The fans are connected to a bottom of most trays 2a.

The tray positioning system comprises two tray supports 70a for supporting each tray 2a. Each tray support 70a is in the form of a triangular casting fastened to the tray 2a underside and having an opening for receiving a shaft 80a of a linkage system (drive system).

The tray positioning system comprises a main mounting frame 300a comprising two frame members 301a, 302a.

The tray positioning system comprises a linkage system (drive system) connected to each tray support 70a such that the trays 2a are able to pivot in unison and parallel with each other relative to the main mounting frame 300a between the different configurations, or such that the trays 2a are able to remain parallel with each other when moved between the different configurations.

A respective hollow frame member 301a, 302a extends alongside each side of the trays 2a and the shafts 80a extend through a wall of the frame member 301a, 302a such that the working regions and tray supports 70a are located at opposite sides of the wall.

The tray supports 70a situated on a first end of the trays 2a are connected to a first frame member 301a, and the tray supports 70a situated on a second end of the trays 2a are connected to a second frame member 302a. The mounting frame 300a also comprises a cross piece 303a connecting the first frame member 301a to the second frame member 302a above the upper most tray 2a—to which the light source 40a and water dispenser 34a are also connected.

Each shaft 80a is connected to each tray support 70a. Each shaft 80a is hollow and has a working region located within a frame member 301a, 302a. The hollow shaft 80a enables wires, pipes or other components to extend through from the frame member 301a, 302a and working region of the shaft 80a to the water dispenser housing 34a and light source 40a to provide a convenient and discrete route for power or light or water to be supplied to each tray 2a.

The tray positioning system comprises a stand 90a to support the trays 2a and linkage system above the ground.

Wires of the lighting system, or parts of the pipe manifold 39a or pipes/hoses 39a of the water dispenser 34a, extend through a frame member 301a, 302a or other components of the unit 10a such as the stand 90a (see FIG. 2).

The linkage system (drive system) comprises at least one drive connected to the working regions of the shafts 80a, such that the shafts 80a can be rotated in unison relative to the mounting frame 300a, such that the mounting frame 300a can be pivoted between the vertical and horizontal configurations.

Figure 18:
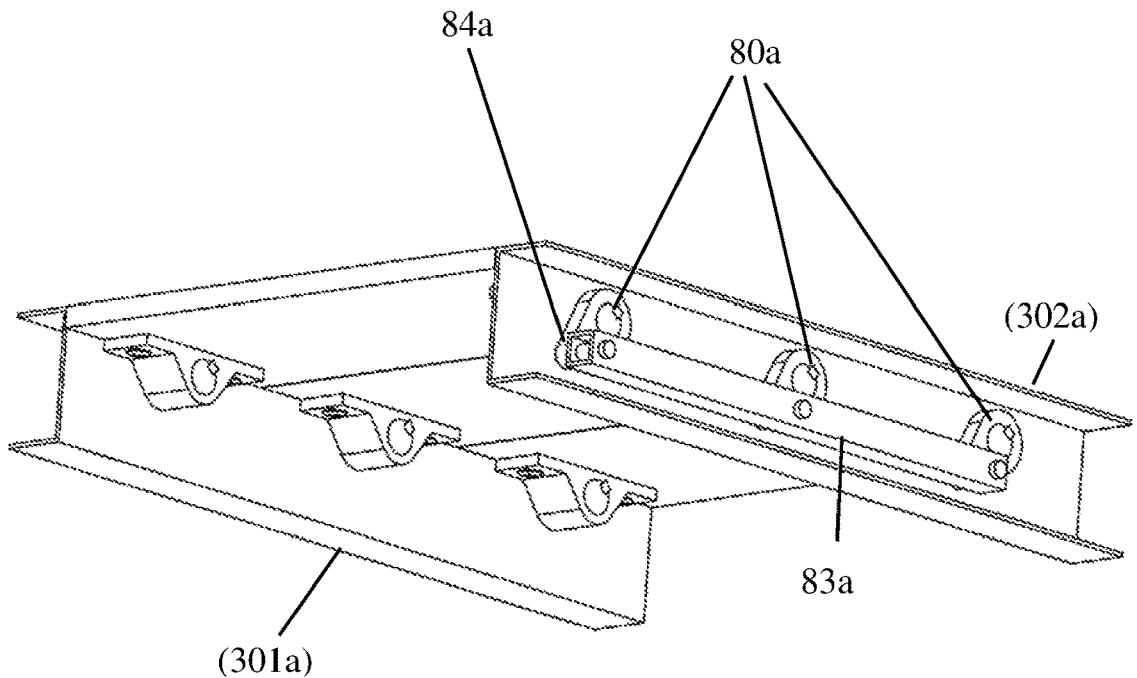
FIG. 18 shows part of a linkage system/drive system which is similar to that employed in the unit shown in FIG. 1 and FIG. 6.

The drive comprises a rigid linkage member 83a connected to the working region of each shaft 80a by way of pivot pin/fastening pin, as generally represented by the mechanism shown in FIG. 18 (although not exactly the same way). The rigid linkage member 83a is in the form of a linear tube. The working region is in the form of a flange 84a and the rigid linkage member 83a is pinned to the flange 84a by way of a pivot pin/fastening pin. When one of the shafts 80a is rotated relative to the mounting frame/frame member 300a, all of the shafts 80a rotate.

The tray positioning system further comprises a stand 90a connected near to a front end of the mounting frame 300a. The stand 90a comprises a front leg assembly each side of the mounting frame and an upper region of each front leg assembly is pivotally connected to the mounting frame 300a. A lower region of each front leg assembly is interconnected by way of interconnecting pieces, to provide a support structure on which the water tank 30a can rest. The stand 90a has wheels. In other embodiments, the stand 90a need not have wheels. Instead, the stand 90a (or other part of the unit 10a) could be anchored to a fixture such as a wall or floor structure.

The tray positioning system comprises a rear leg assembly 91a connected near to the rear end of the mounting frame 300a, to stabilise the unit 10a when in the horizontal configuration. The rear leg assembly 91a comprises a rear leg extending each side of the mounting frame 300a. Each rear leg comprises an upper region and a lower region. The upper region of each rear leg is pivotally connected to the mounting frame 300a. A lower region of each rear leg is pivotally interconnected with the stand 90a by way of interconnecting pieces, for greater stability.

Each of the rear legs is pivotally connected to the mounting frame 300a by way of a pivot pin or shaft to a respective tray support 70a such that when the trays 7a are moved to the vertical configuration then the lower region of each rear leg moves towards the mounting frame (as seen in FIG. 8), and when the trays 2a are moved to the horizontal configuration then the lower region of each rear leg moves away from the mounting frame 300a to meet the ground (as seen in FIG. 1).

The drive further comprises a multi-directional crank and gear assembly 94a that is operably connected to a shaft 80a. The crank 94a can be turned in a first direction to rotate the shafts 80a in unison relative to the mounting frame 300a to raise the mounting frame 300a to the vertical stacked configuration. The crank 94a can also be turned in the opposite direction so as to lower the mounting frame 300a to the horizontal table configuration.

The drive further enables the angle at which every tray 2a extends to be adjusted at the same time. That is, the shaft 80a that is connected to the tray support 70a can be further pivoted/rotated as required despite engaging the drive. This is important for the unloading of fodder mats/biscuits/root balls, as seen in FIGS. 10 and 11. In some embodiments, a locking gear mechanism utilising meshed gears and a pivoting latch that lockingly engages the gears can be used. In some embodiments, a spring-loaded pivot can be used. In some embodiments, a thread lock can be used for fine adjustment of the tray 2a angle.

Figure 3:
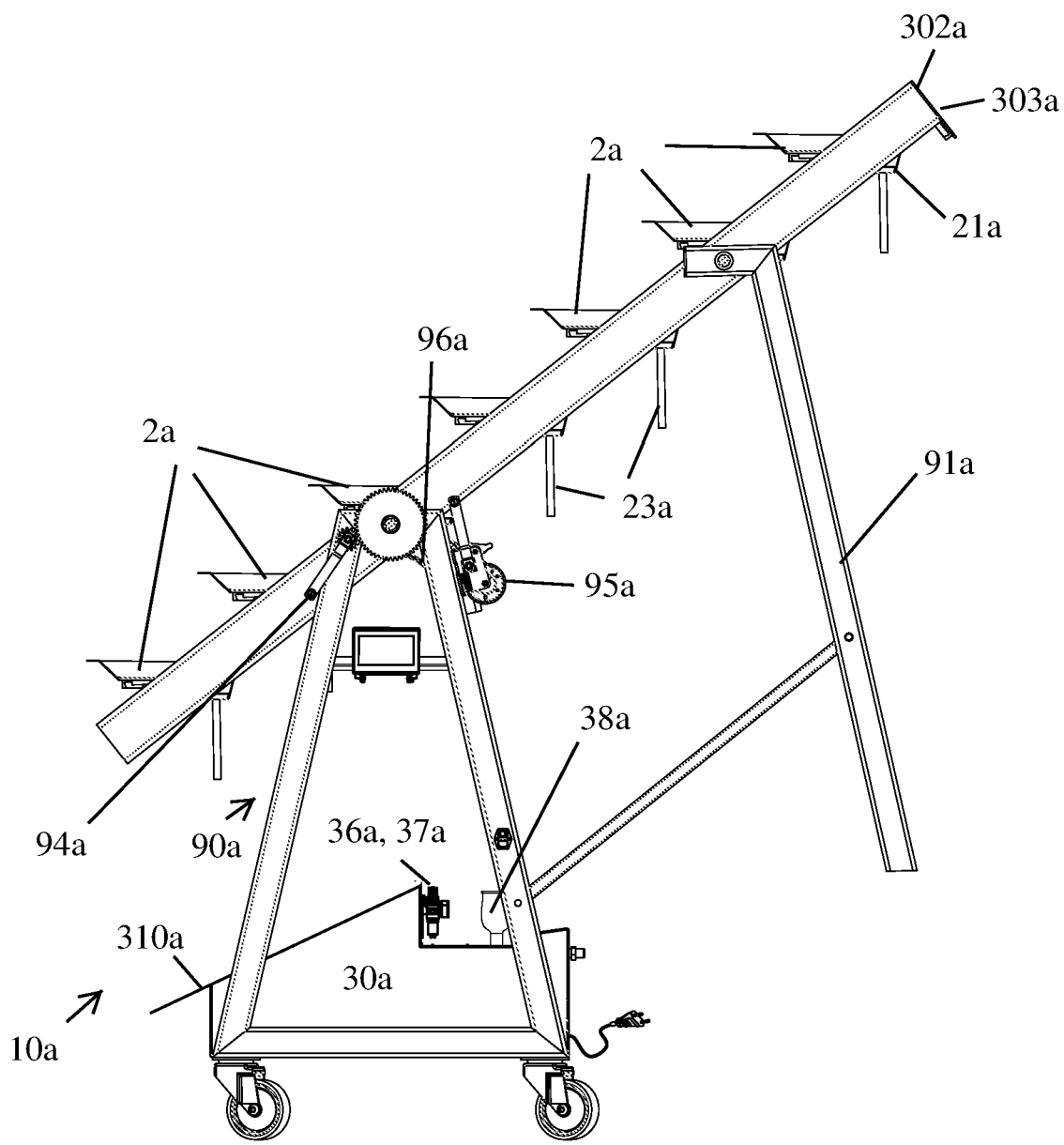
FIG. 3 is a side elevation view of the unit shown in FIG. 1, except that the trays are being pivoted to a substantially vertical stacked configuration.
Figure 12:
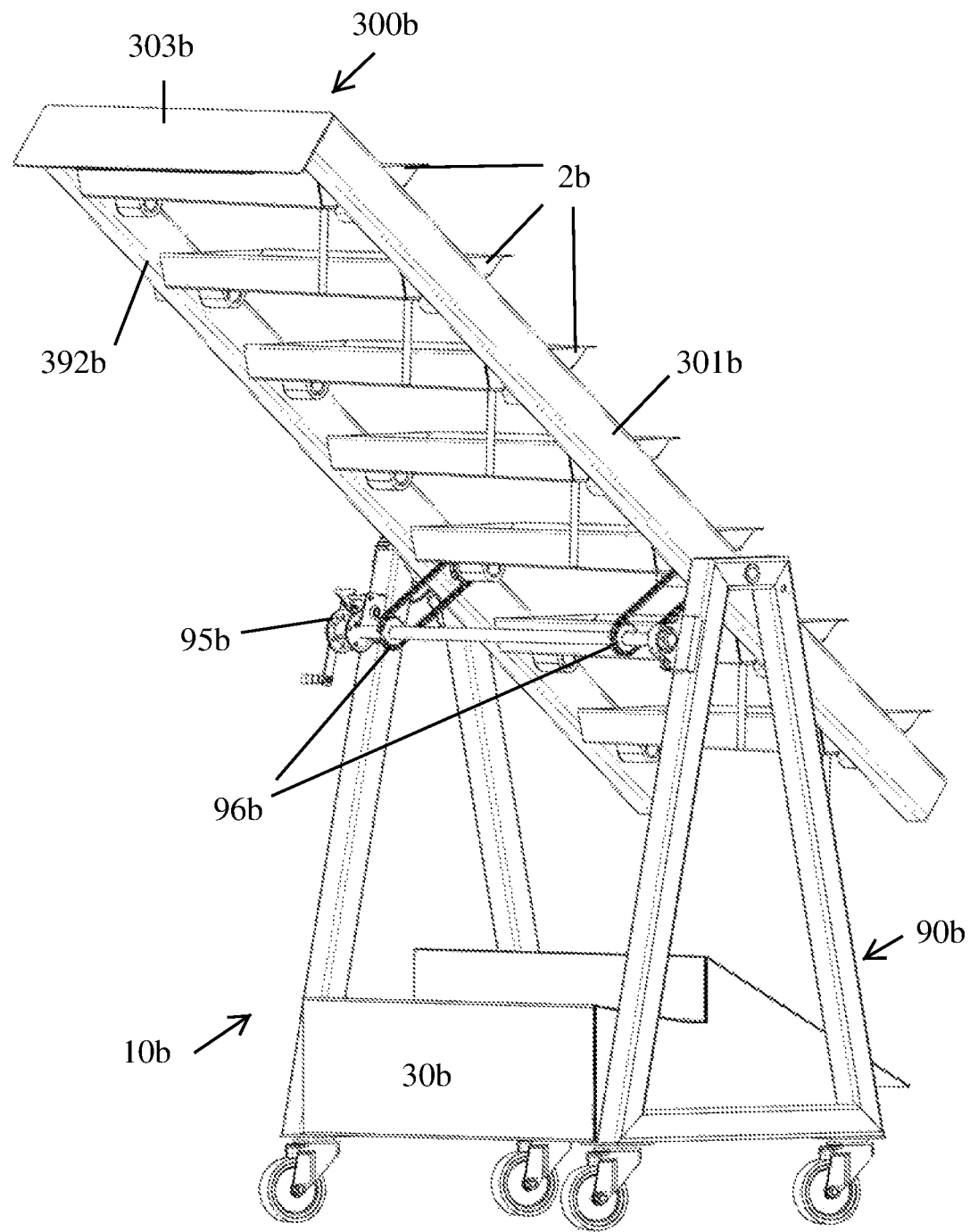
FIG. 12 is rear underside view of the unit shown in FIG. 10.
Figure 13:
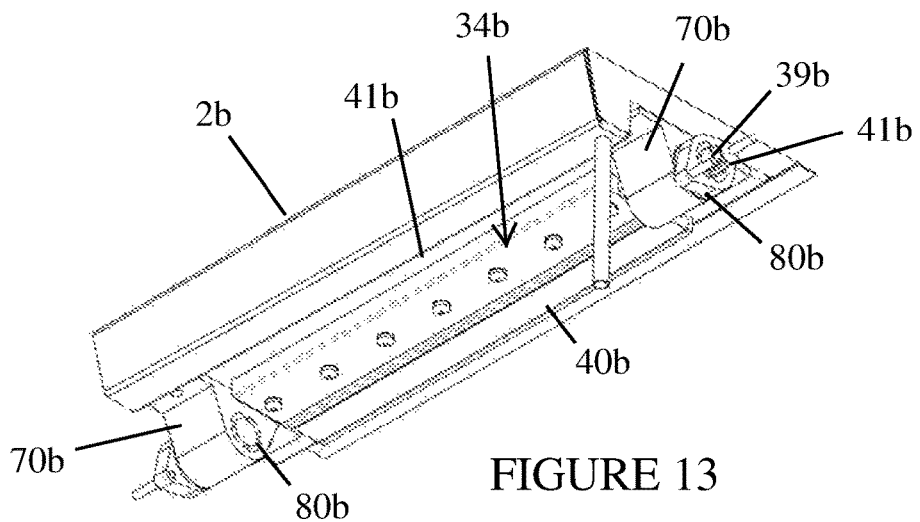
FIG. 13 is an underside perspective view of a tray and other components, virtually identical to that shown in FIG. 4, according to another embodiment of the present invention.
Figure 14:
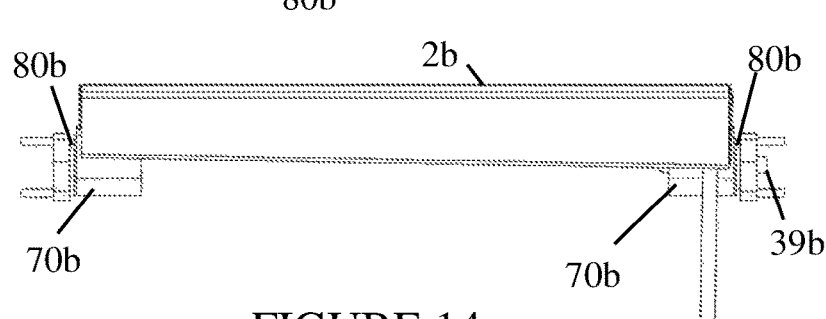
FIG. 14 is a front elevation view of that shown in FIG. 13.
Figure 15:
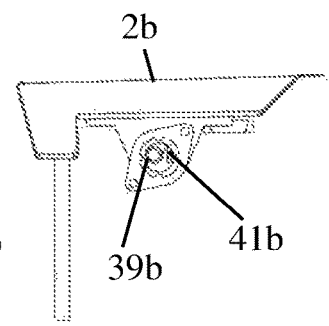
FIG. 15 of the side elevation view of that shown in FIG. 14.
Figure 16:
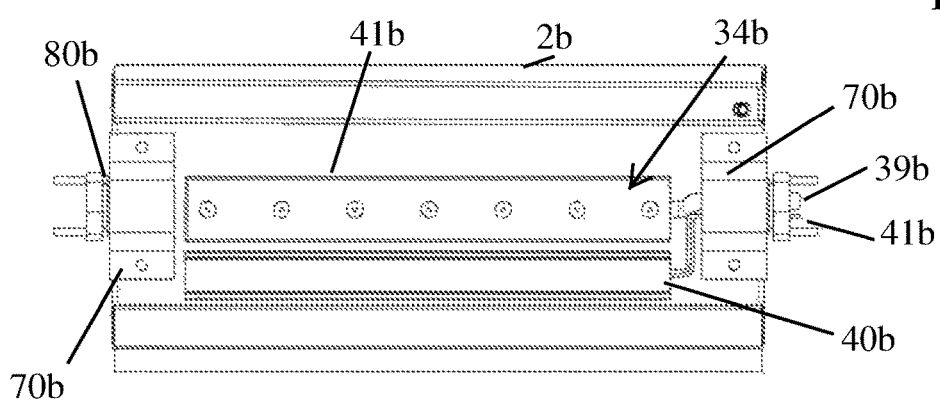
FIG. 16 is a bottom plan view of that shown in FIG. 13.

The drive further comprises a second crank 95a that is operably connected to both shafts 80a of a tray 2a by way of a drive in the form of an endless chain and sprocket arrangement 96a (see FIGS. 3 and 12). When the crank 95a is turned in a first direction, the trays 2a can collapse as shown in FIG. 10. When the crank 95a is turned in a reverse direction, the trays 2a can once again extend in a horizontal manner.

As seen in FIG. 17, the tray positioning system (or unit 10c) can comprise an anti-tip system so that the unit 10c is always balanced when moving between the different configurations. Leg assemblies 250c can be pivotally connected to the mounting frame 300c. Legs of the leg assemblies 250c can extend apart from each other when pivoting to the horizontal configuration, and the legs can move closer together when pivoting to the vertical configuration.

The anti-tip leg system includes a front leg assembly 230c. The front leg assembly 230c includes an upwardly extending pair of legs 231c, each having an upper region pivotally connected to the mounting frame 300c, and a lower region supporting a wheel (roller, castor etc.). The upwardly extending legs 231c extend generally parallel with each other, alongside the trays 2c and respective frame member of the mounting frame 300c. Each upwardly extending leg 231c is linear and extends towards a front end 102c and generally in a parallel plane with a frame member of the mounting frame 300c.

The anti-tip leg system includes a rear leg assembly 235c connected to the mounting frame 300c. The rear leg assembly 235c includes an upwardly extending pair of legs 236c, each having an upper region pivotally connected to the mounting frame 300c, and a lower region supporting a wheel (roller, castor etc.). The upwardly extending legs 236cb extend parallel with each other, alongside a tray 2c and respective frame member of the mounting frame 300c. Each upwardly extending leg 236c is straight/linear and extends at an angle (relative to vertical) towards a rear end 103c.

The upwardly extending legs 231c, 236c are elongate tubular members. Each upper region of each upwardly extending leg 231c, 236c is pivotally connected using a pin to the mounting frame 300c.

The anti-tip leg system includes a linkage assembly 238c extending between the upwardly extending leg 231c, 236c of each of the front and rear leg assemblies 230c, 235c. The linkage assembly 238c includes a hinged brace 239c comprising a central hinge region 390c, a first end pivotally connected to the upwardly extending leg 231c of the front leg assembly 230c and a second end pivotally connected to the upwardly extending leg 236c of the rear leg assembly 235c. A first hinged brace 239c is connected to a first pair of upwardly extending legs 231c, 236c, and a second hinged brace 239c is connected to a second pair of upwardly extending legs 231c, 236c.

When moving to the vertical configuration, the lower regions of the upwardly extending legs 231c, 236c move towards each other and the hinge region 390c enables the hinged brace 239c to fold upwardly. When moving to the substantially horizontal tray configuration, the lower regions of the upwardly extending legs 231c, 236c move away from each other to a maximum spacing dictated by the length of the hinged braces 239c, and the hinged braces 239c unfold and extend substantially horizontally.

The linkage assembly 238c further includes a riser 240c extending from the central hinge region 390c of the hinged brace 239c to a bracket 241c of the mounting frame 300c. A riser 240c extends from each hinged brace 239c to a respective bracket 241c. The riser 240c has an upper end and a lower end. The lower end is pivotally connected to the central hinge region 390c of the hinged brace 239c, and the upper end is pivotally connected to the bracket 241c. When moving from the vertical tray configuration to the horizontal tray configuration, movement of the mounting frame 300c towards the horizontal causes the riser 240c to push down against the central hinge region 390c so that the hinged brace 239c is caused to straighten, which in turn causes the lower regions of the upwardly extending legs 231c, 236c to move apart. When moving from the substantially horizontal tray configuration to the vertical tray configuration, the mounting frame 300c moves from the horizontal, causing the riser 240c to pull on the central hinge region 390c and therefore causing the lower regions of the upwardly extending legs 231c, 236c to move towards each other.

In use, the unit 10a,b is first configured as a table, as shown in FIG. 1. The trays 2a,b are charged with seeds/sprouts. The unit 10a,b is then pivoted to the vertical configuration using the crank 95a,b, as seen in FIG. 8.

The unit 10a,b is then connected to power and water. The power operates the light source 4a,b at the bottom of each tray 2a,b and the water pump 33a. Water fills the tank 30a,b until the float valve 31a closes the inlet 32a.

The control system is used to program the water pump 33a and lighting cycle.

Any excess water sprayed onto the trays 2a,b is drained back to the tank 30a,b via the drain pipes 23a,b.

When the root mat/biscuit is ready for harvest, power and water is disconnected and the unit 10a,b is wheeled to the place for harvest. The second crank 95a,b is then used to collapse the trays 2a,b (see FIGS. 10 and 11) such that the mats/biscuits fall and slip off the top wall 310a of the tank 30a,b for collection in a container.

The unit 10a,b can then be washed down in this state, then the trays 2a,b wound back into the table configuration ready to for further charging with seed.

Figure 19:
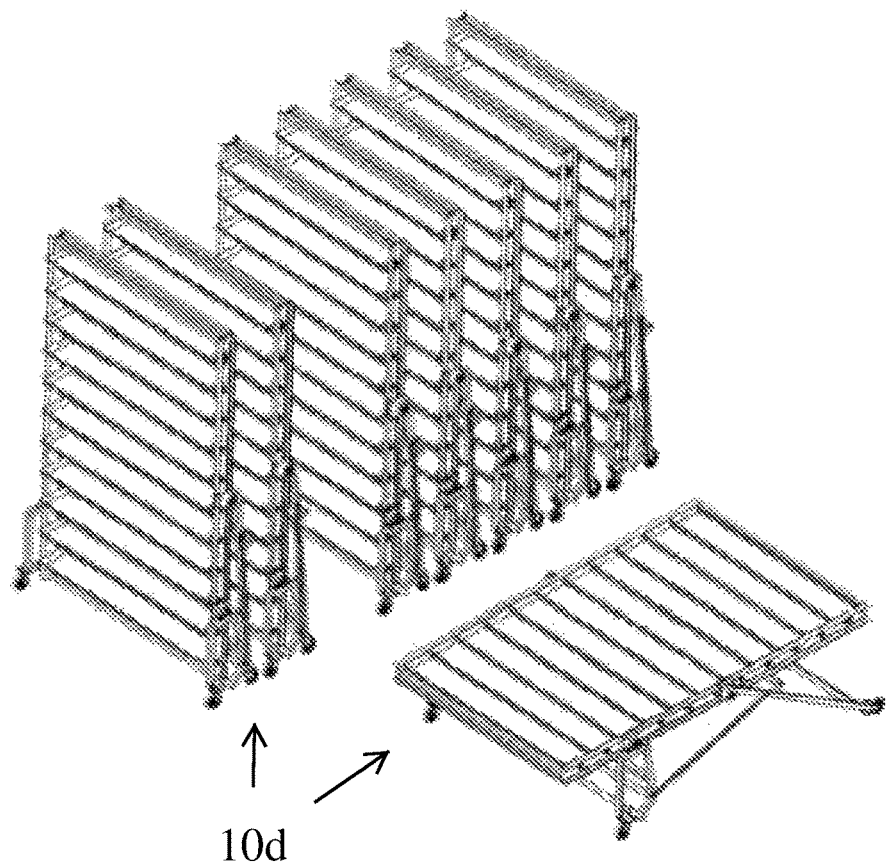
FIG. 19 is an isometric view of larger scale production units employing an anti-tip system, according to another embodiment of the present invention.

Referring now to FIG. 19, there is shown larger-scale anti-tip production units 10d, similar to unit 10c. In the vertical configuration, the unit 10d has a footprint of 1.79 m$^3$. In the horizontal configuration, the unit 10d has a footprint of 10.24 m$^3$. The trays provide a growing surface area of 6.6 m$^3$. The width (shown to be 2.56 m) can be up to 10 m wide, but preferably is around 4-6 m wide.

The invention claimed is:

1. A production unit for growing or propagating organisms, the production unit comprising a production surface positioning system comprising a plurality of production surfaces movable between (1) a substantially vertical stacked configuration whereby the production surfaces extend in spaced substantially horizontal parallel planes above one another, and (2) a substantially horizontal configuration whereby the production surfaces are positioned next to one another on substantially the same horizontal plane;

wherein the production unit further comprises one or more of:
a temperature controlling system wherein the temperature controlling system is capable of heating or cooling the underside of at least one said production surface;
a lighting system comprising a light source connected to a bottom of at least one said production surface for illuminating the production surface beneath when the production surfaces are in the substantially vertical stacked configuration;
a ventilation system comprising at least one fan connected to a bottom of at least one said production surface for circulating air over the production surface beneath when the production surfaces are in the substantially vertical stacked configuration; and
an irrigation system comprising a fluid dispenser connected to a bottom of at least one said production surface for irrigating the production surface beneath when the production surfaces are in the substantially vertical stacked configuration.

2. The production unit of claim 1, wherein the production surface positioning system further comprises:
at least one production surface support for supporting each production surface; and
a linkage system connected to each production surface support, wherein the linkage system comprises at least one mounting frame extending alongside said at least one production surface support;
wherein the plurality of production surfaces are able to pivot in unison and substantially parallel with each other relative to the mounting frame between (1) the substantially vertical stacked configuration, and (2) the substantially horizontal configuration.

3. The production unit of claim 2, wherein each said at least one production surface support is connected or connectable to a rotatable shaft of a linkage system.

4. The production unit of claim 3, wherein the linkage system comprises a respective shaft connected or connectable to each production surface support.

5. The production unit of claim 4, wherein said shafts extend through a wall of the mounting frame such that the production surface supports are located at opposite sides of the wall.

6. The production unit of claim 5, wherein each said shaft has a working region, and wherein the linkage system comprises at least one drive connected to said working regions of said shafts, such that all of said shafts are rotatable in unison relative to the mounting frame.

7. The production unit of claim 6, wherein the drive comprises at least one rigid linkage member that is connectable to the working regions of the shafts.

8. The production unit of claim 6, wherein the drive comprises at least one chain or belt drive that engages with the working regions of the shafts.

9. The production unit of claim 2, further comprising at least one leg assembly to support said plurality of production surfaces and linkage system above the ground, wherein the leg assembly is a stand, and wherein the stand comprises a front leg assembly each side of the mounting frame, wherein an upper region of each front leg assembly is pivotally connected to the mounting frame, and a lower region of each front leg assembly is interconnected by way of one or more interconnecting pieces.

10. The production unit of claim 2, wherein the production surface positioning system comprises an anti-tip system, wherein the anti-tip system comprises a front leg assembly and a rear leg assembly to support the production surfaces and linkage system above the ground, wherein the front leg assembly comprises an upwardly extending front leg each side of the mounting frame, wherein an upper region of each front leg is pivotally connected to the mounting frame and a lower region of each front leg is interconnected by way of one or more interconnecting pieces, and wherein the rear leg assembly comprises an upwardly extending rear leg each side of the mounting frame.

11. The production unit of claim 1, wherein each production surface has a base, a front end, a rear end, and opposing edges.

12. The production unit of claim 11, wherein the base has an organism-support surface, and at least one drain extending beneath the organism support surface.

13. The production unit of claim 1, wherein the production unit further comprises the irrigation system comprising the fluid dispenser connected to a bottom of at least one said production surface for irrigating the production surface beneath when the production surfaces are in the substantially vertical stacked configuration.

14. The production unit of claim 1, wherein the production unit further comprises the lighting system comprising the light source connected to a bottom of at least one said production surface for illuminating the production surface beneath when the production surfaces are in the substantially vertical stacked configuration.

15. The production unit of claim 14, wherein the lighting system comprises a lighting power source electrically connected to the light sources.

16. The production unit of claim 1, wherein the production unit further comprises the temperature controlling system wherein the temperature controlling system is capable of heating or cooling the underside of at least one said production surface.

17. The production unit of claim 16, wherein the temperature controlling system comprises temperature transfer components for heating or cooling fluid to a predetermined temperature.

18. The production unit of claim 1, wherein the production unit further comprises the ventilation system comprising the at least one fan connected to a bottom of at least one said production surface for circulating air over the production surface beneath when the production surfaces are in the substantially vertical stacked configuration.

19. A system comprising at least two production units of claim 1, wherein there is a common infrastructure of at least one fluid supply or at least one power supply, wherein each production unit can connect to and disconnect from said common infrastructure.

20. The system of claim 19, wherein the at least two production units are mobile and comprise one or more rollers, wheels, casters or a propulsion mechanism such that each unit has mobility either manually or autonomously.

21. An autonomous automated system comprising at least two production units of claim 1 and a propulsion unit, wherein there is a common infrastructure of at least one fluid supply or at least one power supply, wherein each production unit can connect to and disconnect from said common infrastructure when being moved by the propulsion unit.

\* \* \* \* \*